US009924197B2

United States Patent
Shimizu et al.

(10) Patent No.: US 9,924,197 B2
(45) Date of Patent: Mar. 20, 2018

(54) IMAGE ENCODING METHOD, IMAGE DECODING METHOD, IMAGE ENCODING APPARATUS, IMAGE DECODING APPARATUS, IMAGE ENCODING PROGRAM, AND IMAGE DECODING PROGRAM

(71) Applicant: NIPPON TELEGRAPH AND TELEPHONE CORPORATION, Tokyo (JP)

(72) Inventors: Shinya Shimizu, Yokosuka (JP); Shiori Sugimoto, Yokosuka (JP); Hideaki Kimata, Yokosuka (JP); Akira Kojima, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 172 days.

(21) Appl. No.: 14/652,673

(22) PCT Filed: Dec. 20, 2013

(86) PCT No.: PCT/JP2013/084376
§ 371 (c)(1),
(2) Date: Jun. 16, 2015

(87) PCT Pub. No.: WO2014/103966
PCT Pub. Date: Jul. 3, 2014

(65) Prior Publication Data
US 2015/0334418 A1 Nov. 19, 2015

(30) Foreign Application Priority Data

Dec. 27, 2012 (JP) ................................ 2012-284616

(51) Int. Cl.
*H04N 19/17* (2014.01)
*H04N 19/597* (2014.01)
(Continued)

(52) U.S. Cl.
CPC ....... *H04N 19/597* (2014.11); *H04N 13/0011* (2013.01); *H04N 13/0022* (2013.01);
(Continued)

(58) Field of Classification Search
CPC ........... H04N 13/0011; H04N 13/0022; H04N 13/0048; H04N 19/17; H04N 19/44; H04N 19/597
(Continued)

(56) References Cited

U.S. PATENT DOCUMENTS

| 8,311,111 B2 * | 11/2012 | Xu | H04N 19/51 |
| | | | 375/240.08 |
| 8,823,821 B2 * | 9/2014 | Tian | H04N 7/181 |
| | | | 348/218.1 |

(Continued)

FOREIGN PATENT DOCUMENTS

CN 101309411 A 11/2008
CN 101729891 A 6/2010
(Continued)

OTHER PUBLICATIONS

Schwarz et al, Extension of High Efficiency Video Coding (HEVC) for Multiview video and Depth Data, 2012.*
(Continued)

*Primary Examiner* — Shan Elahi
(74) *Attorney, Agent, or Firm* — Harness, Dickey & Pierce, P.L.C.

(57) ABSTRACT

An image encoding/decoding apparatus for performing encoding/decoding while predicting an image between different views using a reference image for a view different from a processing target image and a reference depth map which is a depth map for an object of the reference image when a multi-view image including images of a plurality of different views is encoded/decoded includes a reference
(Continued)

depth region setting unit configured to set a reference depth region which is a corresponding region on the reference depth map for decoding target regions into which the processing target image is divided, and an inter-view prediction unit configured to generate an inter-view predicted image for the processing target region from the reference image using depth information in the reference depth region as depth information for the processing target region.

17 Claims, 16 Drawing Sheets

(51) Int. Cl.
　　　*H04N 19/44* (2014.01)
　　　*H04N 13/00* (2018.01)
(52) U.S. Cl.
　　　CPC .......... *H04N 13/0048* (2013.01); *H04N 19/17* (2014.11); *H04N 19/44* (2014.11)
(58) Field of Classification Search
　　　USPC ...................................... 375/240.08, 240.01
　　　See application file for complete search history.

(56) References Cited

U.S. PATENT DOCUMENTS

| | | | | |
|---|---|---|---|---|
| 9,736,454 | B2* | 8/2017 | Hannuksela | H04N 13/0048 |
| 2003/0235341 | A1* | 12/2003 | Gokturk | G06K 9/00228 |
| | | | | 382/243 |
| 2006/0146143 | A1* | 7/2006 | Xin | H04N 19/597 |
| | | | | 348/218.1 |
| 2008/0107180 | A1* | 5/2008 | Lee | H04N 19/52 |
| | | | | 375/240.16 |
| 2009/0296811 | A1* | 12/2009 | Jeon | H04N 19/597 |
| | | | | 375/240.12 |
| 2010/0021072 | A1 | 1/2010 | Shimizu et al. | |
| 2010/0098155 | A1* | 4/2010 | Demircin | H03M 7/4006 |
| | | | | 375/240.02 |
| 2010/0215100 | A1* | 8/2010 | Jeon | H04N 19/597 |
| | | | | 375/240.12 |
| 2011/0038418 | A1* | 2/2011 | Pandit | G06T 9/001 |
| | | | | 375/240.16 |
| 2011/0255796 | A1* | 10/2011 | Nakamura | H04N 19/597 |
| | | | | 382/232 |
| 2011/0292044 | A1* | 12/2011 | Kim | H04N 13/0011 |
| | | | | 345/419 |
| 2011/0293001 | A1* | 12/2011 | Lim | G06K 9/36 |
| | | | | 375/240.12 |
| 2012/0027291 | A1 | 2/2012 | Shimizu et al. | |
| 2012/0056981 | A1* | 3/2012 | Tian | H04N 19/597 |
| | | | | 348/42 |
| 2012/0106622 | A1* | 5/2012 | Huang | H04N 19/129 |
| | | | | 375/240.01 |
| 2012/0320986 | A1 | 12/2012 | Shimizu et al. | |
| 2013/0229485 | A1* | 9/2013 | Rusanovskyy | H04N 13/0048 |
| | | | | 348/43 |
| 2013/0301721 | A1* | 11/2013 | Shimizu | H04N 19/00769 |
| | | | | 375/240.12 |
| 2013/0336405 | A1* | 12/2013 | Chen | H04N 19/597 |
| | | | | 375/240.16 |
| 2014/0126642 | A1* | 5/2014 | Takahashi | H04N 19/597 |
| | | | | 375/240.16 |
| 2014/0132713 | A1* | 5/2014 | Tanaka | H04N 19/597 |
| | | | | 348/43 |
| 2014/0168362 | A1* | 6/2014 | Hannuksela | H04N 19/597 |
| | | | | 348/43 |
| 2014/0218473 | A1* | 8/2014 | Hannuksela | H04N 19/597 |
| | | | | 348/43 |
| 2014/0294088 | A1* | 10/2014 | Sung | H04N 19/597 |
| | | | | 375/240.16 |
| 2014/0301463 | A1* | 10/2014 | Rusanovskyy | H04N 19/52 |
| | | | | 375/240.14 |
| 2014/0307787 | A1* | 10/2014 | Zheng | H04N 19/597 |
| | | | | 375/240.12 |
| 2014/0328389 | A1* | 11/2014 | Fu | H04N 19/597 |
| | | | | 375/240.02 |
| 2015/0304665 | A1* | 10/2015 | Hannuksela | H04N 19/70 |
| | | | | 375/240.02 |
| 2015/0350678 | A1* | 12/2015 | Shimizu | H04N 19/523 |
| | | | | 375/240.16 |

FOREIGN PATENT DOCUMENTS

| | | | | |
|---|---|---|---|---|
| CN | 101911700 | A | 12/2010 | |
| CN | 102265617 | A | 11/2011 | |
| CN | 102801995 | A | 11/2012 | |
| EP | 2375752 | A2 | 10/2011 | |
| EP | 2672709 | A1 * | 12/2013 | ............ G06T 9/001 |
| JP | 2010-021844 | A | 1/2010 | |
| JP | 2010-157826 | A | 7/2010 | |
| JP | 2012-100019 | A | 5/2012 | |
| JP | 2012-124564 | A | 6/2012 | |
| JP | 2012-191553 | A | 10/2012 | |
| KR | 2009-0053820 | A | 5/2009 | |
| KR | 20100117888 | A | 11/2010 | |
| KR | 10-2011-0114614 | A | 10/2011 | |
| KR | 10-2011-0119709 | A | 11/2011 | |
| KR | 10-2012-0000485 | A | 1/2012 | |
| KR | 2012-0117888 | A | 10/2012 | |
| WO | WO-2008/035665 | A1 | 3/2008 | |
| WO | WO-2010/095471 | A1 | 8/2010 | |
| WO | WO-2011/105297 | A1 | 9/2011 | |
| WO | WO 2012/060156 | A1 | 5/2012 | |
| WO | WO-2012/086829 | A1 | 6/2012 | |
| WO | WO-2012/172634 | A1 | 12/2012 | |
| WO | WO 2012172634 | A1 * | 12/2012 | ........... H04N 19/597 |

OTHER PUBLICATIONS

Xu et al, Fast Disparity Motion Estimation in MVC based on Range Prediction, 2008.*
S. Shimizu, M. Kitahara, H. Kimata, K. Kamikura, and Y. Yashima, "View Scalable Multiview Video Coding Using 3-D Warping with Depth Map", IEEE Transactions on Circuits and System for Video Technology, vol. 17, No. 11, pp. 1485-1495, Nov. 2007.
Y. Mori, N. Fukushima, T. Fujii, and M. Tanimoto, "View Generation with 3D Warping Usig Depth Information for FTV", in Proceedings of 3DTV-CON2008, pp. 229-232, May 2008.
S. Yea and A. Vetro, "View Synthesis Prediction for Rate-Overhead Reduction in FTV", in Proceedings of 3DTV-CON2008, pp. 145-148, May 2008.
Office Action dated Jul. 5, 2016 in corresponding Chinese Application No. 201380068069.1 with English translation.
ITU-T Recommendation H.264 (Mar. 2009), "Advanced Video Coding for Generic Audiovisual Services," Mar. 2009.
Shinya Shimizu, Masaki Kitahara, Kazuto Kamikura and Yoshiyuki Yashima, "Multi-view Video Coding based on 3-D Warping with Depth Map," in Proceedings of Picture Coding Symposium 2006, SS3-6, Apr. 2006.
Olivier Faugeras, "Three-Dimensional Computer Vision," MIT Press; BCTC/UFF-006.37 F259 1993, ISBN: 0-262-06158-9.
International Search Report for PCT/JP2013/084376, ISA/JP, dated Apr. 1, 2014.
Notice of Non-Final Rejection, Korean Patent Application No. 10-2015-7015726, dated Feb. 29, 2016.
Chinese Office Action for parallel application CN 201380068069.1, with partial translation of Search Report, Patent Examination Cooperation Center, Henan, China, dated Feb. 20, 2017.
Notice of Allowance for Korean Patent Application KR-10-2015-7015726, KIPO, dated Mar. 14, 2017, with English translation thereof.
Emin Martinian, Alexander Behrens, Jun Xin, Anthony Vetro, and Huifang Sun, "Extensions of H.264/AVC for Multiview Video Compression", MERL Technical Report, TR2006-048, Jun. 2006.
OA-1 International Search Report for PCT/JP2013/084377, ISA/JP, dated Mar. 11, 2014 with English translation.

(56) References Cited

OTHER PUBLICATIONS

OA-2 Korean Office Action for KR 10-2015-7014220, dated Feb. 16, 2016 with translation.
OA-3 Chinese Office Action for CN 201380067761.2, dated Jul. 5, 2016 with translation.

* cited by examiner

IMAGE ENCODING METHOD, IMAGE DECODING METHOD, IMAGE ENCODING APPARATUS, IMAGE DECODING APPARATUS, IMAGE ENCODING PROGRAM, AND IMAGE DECODING PROGRAM

CROSS-REFERENCE TO RELATED APPLICATIONS

This application is a 371 U.S. National Stage of International Application No. PCT/JP2013/084376, filed on Dec. 20, 2013, which claims the benefit of and priority to Japanese Patent Application No. 2012-284616, filed on Dec. 27, 2012. The disclosures of the above applications are incorporated herein by reference.

TECHNICAL FIELD

The present invention relates to an image encoding method, an image decoding method, an image encoding apparatus, an image decoding apparatus, an image encoding program, and an image decoding program for encoding and decoding a multi-view image.

BACKGROUND ART

Conventionally, multi-view images each including a plurality of images obtained by photographing the same object and background using a plurality of cameras are known. A moving image captured by the plurality of cameras is referred to as a multi-view moving image (multi-view video). In the following description, an image (moving image) captured by one camera is referred to as a "two-dimensional image (moving image)," and a group of two-dimensional images (two-dimensional moving images) obtained by photographing the same object and background using a plurality of cameras differing in a position and/or direction (hereinafter referred to as a view) is referred to as a "multi-view image (multi-view moving image)."

A two-dimensional moving image has a high correlation in relation to a time direction and coding efficiency can be improved using the correlation. On the other hand, when cameras are synchronized, frames (images) corresponding to the same time of videos of the cameras in a multi-view image or a multi-view moving image are frames (images) obtained by photographing the object and background in completely the same state from different positions, and thus there is a high correlation between the cameras (between different two-dimensional images of the same time). It is possible to improve coding efficiency by using the correlation in coding of a multi-view image or a multi-view moving image.

Here, conventional technology relating to encoding technology of two-dimensional moving images will be described. In many conventional two-dimensional moving-image encoding schemes including H.264, MPEG)-2, and MPEG-4, which are international coding standards, highly efficient encoding is performed using technologies of motion-compensated prediction, orthogonal transform, quantization, and entropy encoding. For example, in H.264, encoding using a temporal correlation with a plurality of past or future frames is possible.

Details of the motion-compensated prediction technology used in H.264, for example, are disclosed in Non-Patent Document 1. An outline of the motion-compensated prediction technology used in H.264 will be described. The motion-compensated prediction of H.264 enables an encoding target frame to be divided into blocks of various sizes and enables the blocks to have different motion vectors and different reference images. Using a different motion vector in each block, highly precise prediction which compensates for a different motion of a different object is realized. On the other hand, prediction having high precision considering occlusion caused by a temporal change is realized using a different reference frame in each block.

Next, a conventional encoding scheme for multi-view images or multi-view moving images will be described. A difference between the multi-view image coding scheme and the multi-view moving-image coding scheme is that a correlation in the time direction is simultaneously present in a multi-view moving image in addition to the correlation between the cameras. However, the same method using the correlation between the cameras can be used in both cases. Therefore, a method to be used in coding multi-view moving images will be described here.

In order to use the correlation between the cameras in coding of multi-view moving images, there is a conventional scheme of encoding a multi-view moving image with high efficiency through "disparity-compensated prediction" in which the motion-compensated prediction is applied to images captured by different cameras at the same time. Here, the disparity is a difference between positions at which the same portion on an object is present on image planes of cameras arranged at different positions. FIG. 15 is a conceptual diagram illustrating the disparity occurring between the cameras. In the conceptual diagram illustrated in FIG. 15, image planes of cameras having parallel optical axes face down vertically. In this manner, the positions at which the same portion on the object are projected on the image planes of the different cameras are generally referred to as a corresponding point.

In the disparity-compensated prediction, each pixel value of an encoding target frame is predicted from a reference frame based on the corresponding relationship, and a prediction residual thereof and disparity information representing the corresponding relationship are encoded. Because the disparity varies for every pair of target cameras and positions of the target cameras, it is necessary to encode disparity information for each region in which the disparity-compensated prediction is performed. Actually, in the multi-view moving-image coding scheme of H.264, a vector representing the disparity information is encoded for each block using the disparity-compensated prediction.

The corresponding relationship provided by the disparity information can be represented as a one-dimensional amount representing a three-dimensional position of an object, rather than a two-dimensional vector, based on epipolar geometric constraints by using camera parameters. Although there are various representations as information representing a three-dimensional position of the object, the distance from a reference camera to the object or a coordinate value on an axis which is not parallel to an image plane of the camera is normally used. The reciprocal of the distance may be used instead of the distance. In addition, because the reciprocal of the distance is information proportional to the disparity, two reference cameras may be set and a three-dimensional position may be represented as the amount of disparity between images captured by the cameras. Because there is no essential difference regardless of what expression is used, information representing three-dimensional positions is hereinafter expressed as a depth without such expressions being distinguished.

FIG. 16 is a conceptual diagram of epipolar geometric constraints. According to the epipolar geometric constraints, a point on an image of another camera corresponding to a point on an image of a certain camera is constrained to a straight line called an epipolar line. At this time, when a depth for a pixel of the image is obtained, a corresponding point is uniquely defined on the epipolar line. For example, as illustrated in FIG. 16, a corresponding point in an image of a second camera for the object projected at a position m in an image of a first camera is projected at a position m' on the epipolar line when the position of the object in a real space is M' and projected at a position m" on the epipolar line when the position of the object in the real space is M".

In Non-Patent Document 2, a highly precise predicted image is generated and efficient multi-view moving-image coding is realized by using this property and synthesizing a predicted image for an encoding target frame from a reference frame in accordance with three-dimensional information of each object given by a depth map (distance image) for the reference frame. Also, the predicted image generated based on the depth is referred to as a view-synthesized image, a view-interpolated image, or a disparity-compensated image.

Further, in Patent Document 1, it is possible to generate a view-synthesized image only for a necessary region by initially converting a depth map for a reference frame into a depth map for an encoding target frame and obtaining a corresponding point using the converted depth map. Thereby, when the image or moving image is encoded or decoded while a method of generating the predicted image is switched for every region of a frame serving as an encoding or decoding target, a processing amount for generating the view-synthesized image or a memory amount for temporarily accumulating the view-synthesized image is reduced.

PRIOR ART DOCUMENTS

Patent Document

Patent Document 1: Japanese Unexamined Patent Application, First Publication No. 2010-21844

Non-Patent Document

Non-Patent Document 1: ITU-T Recommendation H.264 (03/2009), "Advanced Video Coding for Generic Audio-visual Services," March 2009.
Non-Patent Document 2: Shinya SHIMIZU, Masaki KITAHARA, Kazuto KAMIKURA and Yoshiyuki YASHIMA "Multi-view Video Coding based on 3-D Warping with Depth Map," In Proceedings of Picture Coding Symposium 2006, SS3-6, April 2006.

SUMMARY OF INVENTION

Problems to be Solved by the Invention

According to a method disclosed in Patent Document 1, it is possible to obtain a corresponding pixel on a reference frame from pixels of an encoding target frame because a depth is obtained for the encoding target frame. Thereby, when the view-synthesized image is necessary in only a partial region of the encoding target frame, because the view-synthesized image for only a designated region of the encoding target frame is generated, it is possible to reduce the processing amount or the required memory amount compared to the case in which the view-synthesized image of one frame is constantly generated.

However, because it is necessary to synthesize a depth map for an encoding target frame from a depth map for a reference frame when the view-synthesized image for the entire encoding target frame is necessary, there is a problem in that the processing amount increases more than when the view-synthesized image is directly generated from the depth map for the reference frame.

The present invention has been made in view of such circumstances, and an objective of the invention is to provide an image encoding method, an image decoding method, an image encoding apparatus, an image decoding apparatus, an image encoding program, and an image decoding program that enable a view-synthesized image to be generated through a small calculation without significantly degrading the quality of the view-synthesized image when the view-synthesized image of a processing target frame is generated.

Means for Solving the Problems

According to the present invention, there is provided an image decoding apparatus which performs decoding while predicting an image between different views using a reference image decoded for a view different from a decoding target image and a reference depth map which is a depth map for an object of the reference image when the decoding target image is decoded from encoded data of a multi-view image including images of a plurality of different views, the image decoding apparatus including: a reference depth region setting unit configured to set a reference depth region which is a corresponding region on the reference depth map for decoding target regions into which the decoding target image is divided; and an inter-view prediction unit configured to generate an inter-view predicted image for the decoding target region from the reference image using depth information in the reference depth region as depth information for the decoding target region.

The image decoding apparatus of the present invention may further include: a depth reference disparity vector setting unit configured to set a depth reference disparity vector which is a disparity vector for a reference depth map with respect to the decoding target region, wherein the reference depth setting unit sets a region indicated by the depth reference disparity vector as the reference depth region.

In the image decoding apparatus of the present invention, the depth reference disparity vector setting unit may set the depth reference disparity vector using a disparity vector used when a region adjacent to the decoding target region is decoded.

In the image decoding apparatus of the present invention, the depth reference disparity vector setting unit may set the depth reference disparity vector using depth information for a region on the reference depth map having the same position as the decoding target region.

In the image decoding apparatus of the present invention, the inter-view prediction unit may set a representative depth using depth information within the corresponding reference depth region for every predicted region obtained by dividing the decoding target region and generate an inter-view predicted image for the decoding target region by generating a view-synthesized image from the representative depth and the reference image.

The image decoding apparatus of the present invention, the inter-view prediction unit may set an image reference disparity vector which is a disparity vector for the reference image using depth information within the corresponding reference depth region for every predicted region obtained by dividing the decoding target region and generate an inter-view predicted image for the decoding target region by generating a disparity-compensated image using the image reference disparity vector and the reference image.

The image decoding apparatus of the present invention may further include: an image reference disparity vector accumulation unit configured to accumulate the image reference disparity vector; and a disparity prediction unit configured to generate predicted disparity information for a region adjacent to the decoding target region using the accumulated image reference disparity vector.

In the image decoding apparatus of the present invention, the disparity prediction unit may generate a depth reference disparity vector for a region adjacent to the decoding target region.

The image decoding apparatus of the present invention may further include: a correction disparity vector unit configured to set a correction disparity vector which is a vector for correcting the image reference disparity vector, wherein the inter-view prediction unit may generate the inter-view predicted image by generating a disparity-compensated image using a vector obtained by correcting the image reference disparity vector through the correction disparity vector and the reference image.

In the image decoding apparatus of the present invention, the correction disparity vector setting unit may set one vector as the correction disparity vector for the decoding target region.

The image decoding apparatus of the present invention may further include: a predicted region division setting unit configured to set region divisions within the decoding target region based on depth information within the reference depth region, wherein the inter-view prediction unit may designate a region obtained according to the region division as the predicted region.

According to the present invention, there is provided an image decoding method which performs decoding while predicting an image between different views using a reference image decoded for a view different from a decoding target image and a reference depth map which is a depth map for an object of the reference image when the decoding target image is decoded from encoded data of a multi-view image including images of a plurality of different views, the image decoding method including: a reference depth region setting step of setting a reference depth region which is a corresponding region on the reference depth map for decoding target regions into which the decoding target image is divided; and an inter-view prediction step of generating an inter-view predicted image for the decoding target region from the reference image using depth information in the reference depth region as depth information for the decoding target region.

According to the present invention, there is provided an image encoding apparatus which performs encoding while predicting an image between different views using a reference image encoded for a different view from an encoding target image and a reference depth map which is a depth map for an object of the reference image when a multi-view image including images of a plurality of different views is encoded, the image encoding apparatus including: a reference depth region setting unit configured to set a reference depth region which is a corresponding region on the reference depth map for encoding target regions into which the encoding target image is divided; and an inter-view prediction unit configured to generate an inter-view predicted image for the encoding target region from the reference image using depth information in the reference depth region as depth information for the encoding target region.

Further, according to the present invention, there is provided an image encoding method which performs encoding while predicting an image between different views using a reference image encoded for a different view from an encoding target image and a reference depth map which is a depth map for an object of the reference image when a multi-view image including images of a plurality of different views is encoded, the image encoding method including: a reference depth region setting step of setting a reference depth region which is a corresponding region on the reference depth map for encoding target regions into which the encoding target image is divided; and an inter-view prediction step of generating an inter-view predicted image for the encoding target region from the reference image using depth information in the reference depth region as depth information for the encoding target region.

The present invention includes an image encoding program for causing a computer to execute the image encoding method.

The present invention includes an image decoding program for causing a computer to execute the image decoding method.

Advantageous Effects of the Invention

According to the present invention, there is an advantageous effect in that it is possible to omit a process of generating a depth map for a processing target frame and generates a view-synthesized image by directly referring to and employing a depth map for a frame other than a processing target frame when a view-synthesized image of a processing target frame is generated using a depth map for a frame other than a processing target frame, and generate a view-synthesized image in a small calculation amount.

EMBODIMENTS FOR CARRYING OUT THE INVENTION

Hereinafter, an image encoding apparatus and an image decoding apparatus according to embodiments of the present invention will be described with reference to the drawings. In the following description, the case in which a multi-view image captured by a first camera (referred to as a camera A) and a second camera (referred to as a camera B) is encoded is assumed and an image of the camera B is described as being encoded or decoded by designating an image of the camera A as a reference image.

Also, information necessary for obtaining a disparity from depth information is assumed to be separately assigned. Specifically, although this information is an external parameter representing a positional relationship of the cameras A and B or an internal parameter representing projection information for an image plane by the camera, other information may be assigned when a disparity is obtained from the depth information even in other forms. Detailed description relating to these camera parameters, for example, is disclosed in Reference Document <Olivier Faugeras, "Three-Dimensional Computer Vision," MIT Press; BCTC/UFF-006.37 F259 1993, ISBN: 0-262-06158-9>. In this document, description relating to a parameter representing a positional relationship of a plurality of cameras or a parameter representing projection information for an image plane by a camera is disclosed.

In the following description, information (a coordinate value or an index capable of corresponding to the coordinate value) capable of specifying a position added between symbols [ ] to an image or video frame or a depth map is assumed to represent an image signal sampled by a pixel of the same position or a depth corresponding to the image signal. In addition, a coordinate value or a block of a position obtained by shifting coordinates or a block by an amount of a vector is assumed to be represented by the addition of an index value capable of corresponding to a coordinate value or a block to a vector.

Figure 1:
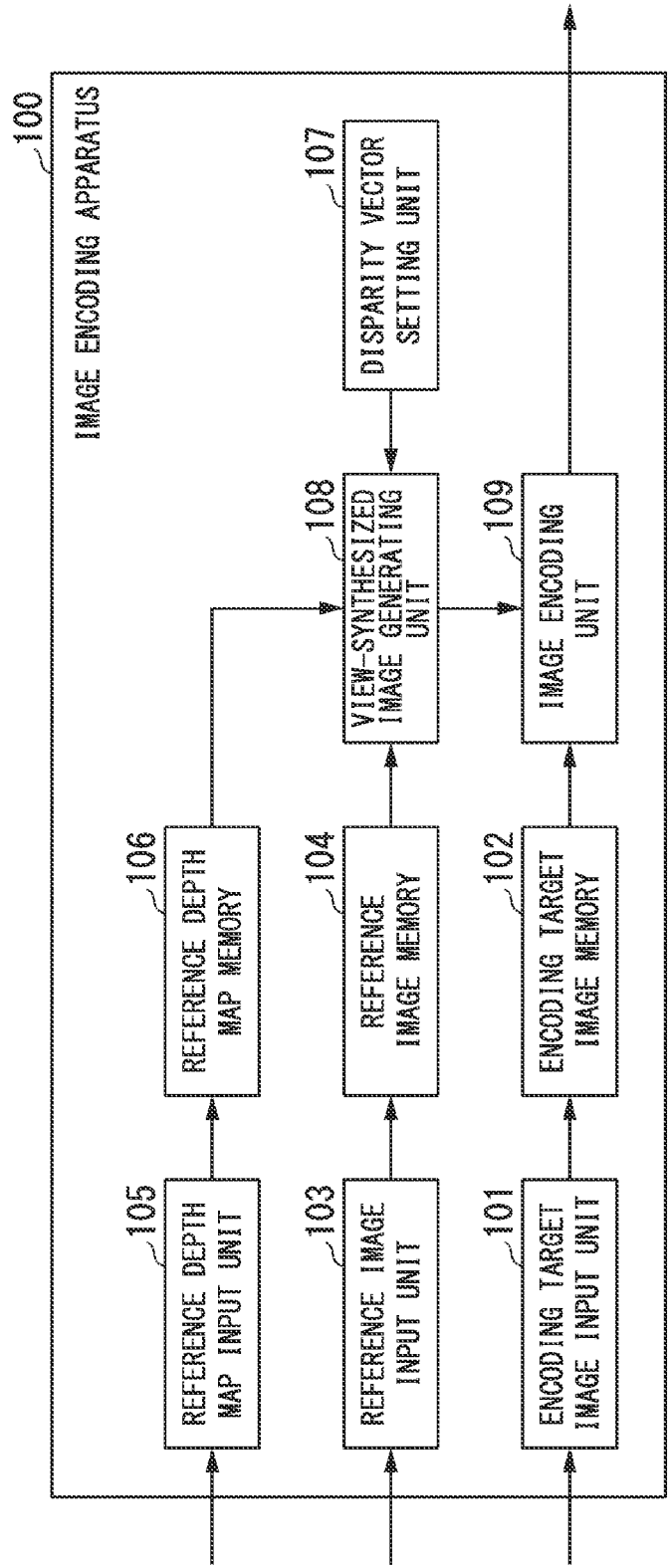
FIG. 1 is a block diagram illustrating a configuration of an image encoding apparatus in an embodiment of the present invention.

FIG. 1 is a block diagram illustrating a configuration of an image encoding apparatus in this embodiment. As illustrated in FIG. 1, the image encoding apparatus 100 includes an encoding target image input unit 101, an encoding target image memory 102, a reference image input unit 103, a reference image memory 104, a reference depth map input unit 105, a reference depth map memory 106, a disparity vector setting unit 107, a view-synthesized image generating unit 108, and an image encoding unit 109.

The encoding target image input unit 101 inputs an image serving as an encoding target. Hereinafter, the image serving as the encoding target is referred to as an encoding target image. Here, the image of the camera B is assumed to be input. In addition, a camera (here, the camera B) capturing the encoding target image is referred to as an encoding target camera.

The encoding target image memory 102 stores the input encoding target image. The reference image input unit 103 inputs an image to be referred to when the view-synthesized image (disparity-compensated image) is generated. Hereinafter, the image input here is referred to as a reference image. Here, an image of the camera A is assumed to be input.

The reference image memory 104 stores the input reference image. Here, the camera (here, the camera A) capturing the reference image is referred to as a reference camera.

The reference depth map input unit 105 inputs a depth map to be referred to when a view-synthesized image is generated. Here, although the depth map for the reference image is assumed to be input, the depth map for another camera may also be input. Hereinafter, this depth map is referred to as a reference depth map.

A three-dimensional position of the object shown in each pixel of the image corresponding to the depth map is indicated. As long as the three-dimensional position is obtained by information of a separately assigned camera parameter or the like, any information may be used. For example, it is possible to use a distance from the camera to the object or a coordinate value for an axis which is not parallel to an image plane and a disparity amount for another camera (for example, the camera B). In addition, because a disparity amount may be obtained here, a disparity map directly representing the disparity amount rather than a depth map may be used. In addition, although the depth map is given in the form of an image here, the depth map may not be configured in the form of an image as long as similar information can be obtained. The reference depth map memory 106 stores the input reference depth map. Hereinafter, a camera (here, the camera A) corresponding to the reference depth map is referred to as a reference camera.

The disparity vector setting unit 107 sets a disparity vector for a reference depth map for every encoding target frame or every bock obtained by dividing the encoding target frame. The view-synthesized image generating unit 108 (inter-view prediction unit) obtains a corresponding relationship between a pixel of an encoding target image and a pixel of a reference image using the reference depth map and generates a view-synthesized image for the encoding target image. The image encoding unit 109 outputs a bitstream which is encoded data obtained by performing predictive encoding on the encoding target image using the view-synthesized image.

Figure 2:
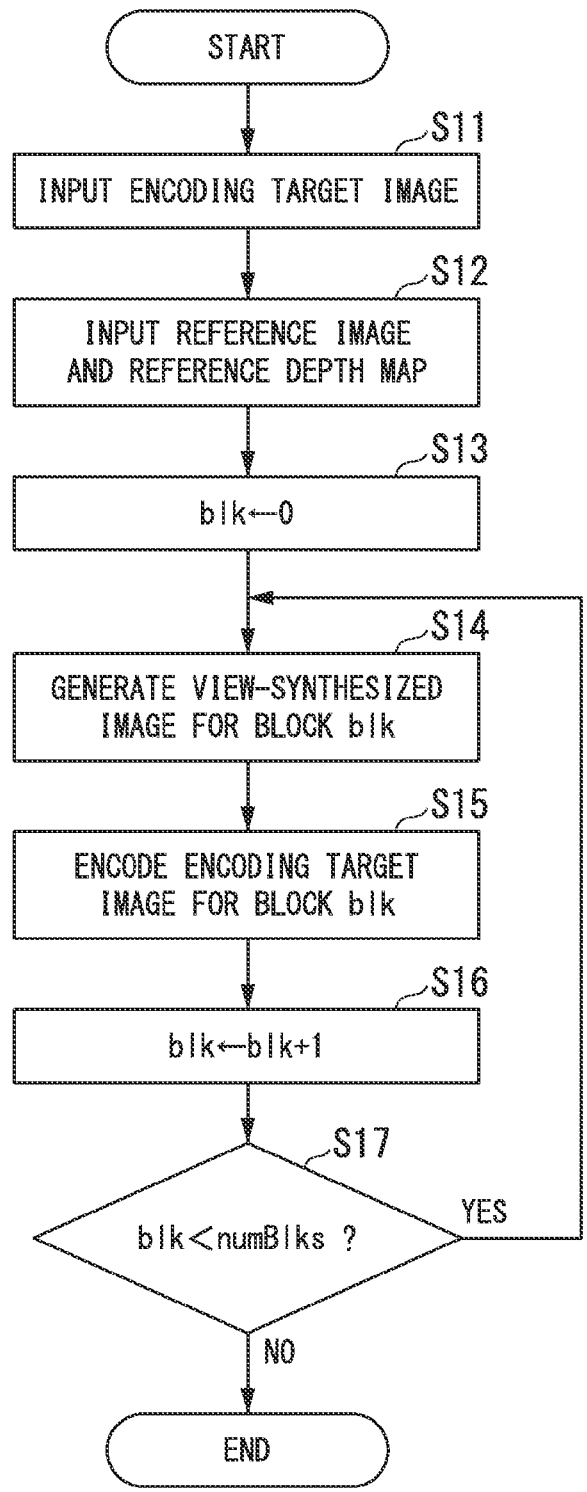
FIG. 2 is a flowchart illustrating an operation of an image encoding apparatus illustrated in FIG. 1.

Next, an operation of the image encoding apparatus 100 illustrated in FIG. 1 will be described with reference to FIG. 2. FIG. 2 is a flowchart illustrating the operation of the image encoding apparatus 100 illustrated in FIG. 1. The encoding target image input unit 101 inputs an encoding target image and stores the input encoding target image in the encoding target image memory 102 (step S11). Next, the reference image input unit 103 inputs a reference image and stores the input reference image in the reference image memory 104. In parallel with this, the reference depth map input unit 105 inputs a reference depth map and stores the input reference depth map in the reference depth map memory 106 (step S12).

Also, the reference image and the reference depth map input in step S12 are assumed to be the same as those to be obtained by the decoding side such as the reference image and the reference depth map obtained by decoding the already encoded reference image and reference depth map. This is because the occurrence of encoding noise such as a drift is suppressed by using exactly the same information as that obtained by the decoding apparatus. However, when this occurrence of encoding noise is allowed, content obtained by only the encoding side such as content before encoding may be input. In relation to the reference depth map, a depth map estimated by applying stereo matching or the like to a multi-view image decoded for a plurality of cameras, a depth map estimated using a decoded disparity vector or motion vector or the like, or the like may be used as a depth map to be equally obtained by the decoding side in addition to content obtained by decoding already encoded content.

Next, the image encoding apparatus 100 encodes the encoding target image while creating a view-synthesized image for every block obtained by dividing the encoding target image. That is, after a variable blk indicating an index of a block of an encoding target image is initialized to 0 (step S13), the following process (steps S14 and S15) is iterated until blk reaches numBlks (step S17) while blk is incremented by 1 (step S16). Also, numBlks indicates the number of unit blocks on which an encoding process is performed in the encoding target image.

In the process to be performed for every block of the encoding target image, first, a view-synthesized image for the block blk is generated in the disparity vector setting unit 107 and the view-synthesized image generating unit 108 (step S14). Here, the process will be described in detail below.

Next, after the view-synthesized image is obtained, the image encoding unit 109 performs predictive encoding on an encoding target image to output a predictive encoding result using the view-synthesized image as a predicted image (step S15). A bitstream obtained as a result of encoding becomes an output of the image encoding apparatus 100. Also, as long as decoding is able to be correctly performed in the decoding side, any method may be used in encoding.

In general moving-image encoding or image encoding such as MPEG-2, H.264, or joint photographic experts group (JPEG), encoding is performed by generating a difference signal between an encoding target image and a predicted image for every block, performing frequency conversion such as a discrete cosine transform (DCT) on a difference image, and sequentially applying processes of quantization, binarization, and entropy encoding on a value obtained as a result.

Although a view-synthesized image is used as a predicted image in all blocks in this embodiment, an image generated by a different method for every block may be used as a predicted image. In this case, it is necessary to discriminate a method in which a generated image is used as a predicted image in the decoding side. For example, a configuration may be made so that the method can be discriminated in the decoding side by encoding information indicating a method (mode or vector information or the like) of generating the predicted image and including the encoded information in a bitstream as in H.264.

Figure 3:
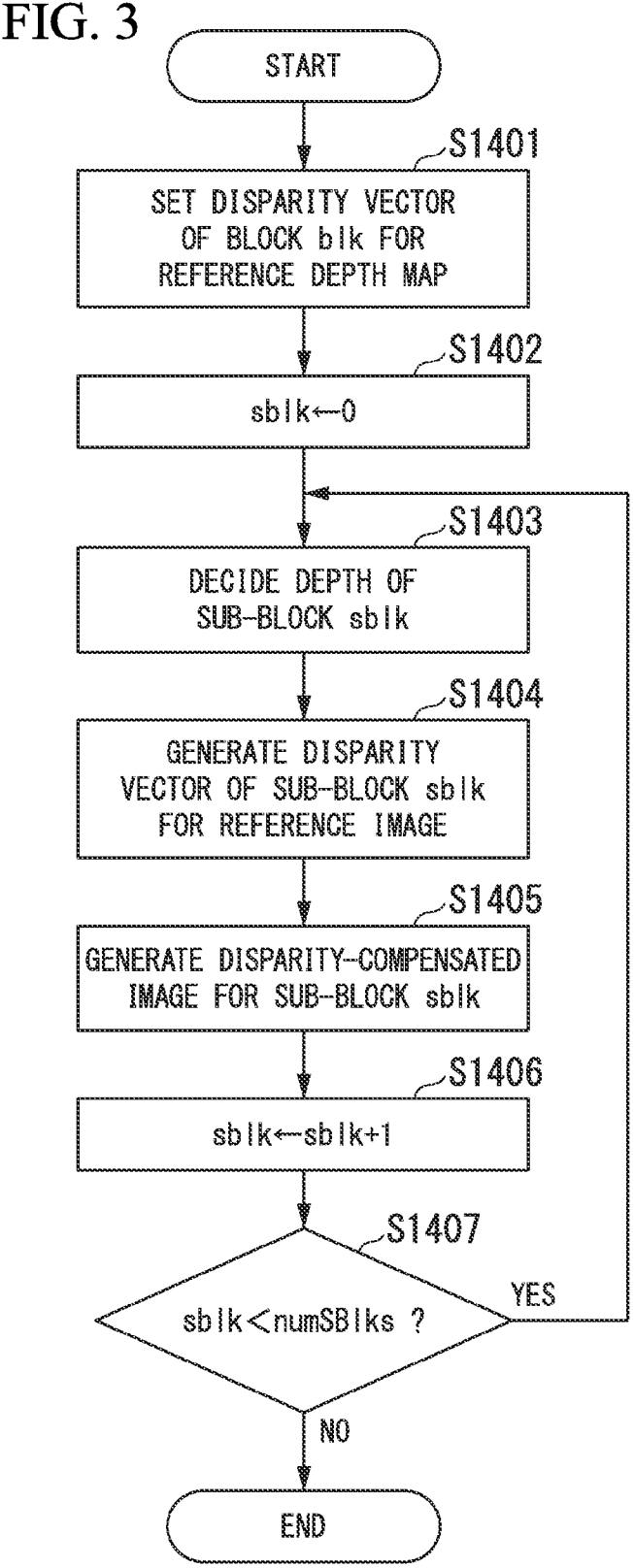
FIG. 3 is a flowchart illustrating a detailed processing operation of a process (step S14) of generating a view-synthesized image for a block blk illustrated in FIG. 2.

Next, processing operations of the disparity vector setting unit 107 and the view-synthesized image generating unit 108 illustrated in FIG. 1 will be described with reference to FIG. 3. FIG. 3 is a flowchart illustrating a detailed processing operation of a process (step S14) of generating a view-synthesized image for a block blk (encoding target region) obtained by dividing an encoding target image illustrated in FIG. 2. First, the disparity vector setting unit 107 (reference depth region setting unit) sets a disparity vector dv (depth reference disparity vector) for indicating a block (reference depth region) on a corresponding reference depth map for the block blk (step S1401, a reference depth region setting step, and a depth reference disparity vector setting step). Although the disparity vector may be set using any method, it is necessary to obtain the same disparity vector in the decoding side.

The disparity vector dv, for example, may be obtained from a depth value of a reference depth map having the same position as the block blk. Specifically, a maximum value, a minimum value, a median value, an average value, or the like among depth values present within a block of the reference depth map having the same position as the block blk may be used for the disparity vector dv. In addition, the disparity vector may be obtained using only depth values for specific pixels such as pixels located at the center and the four apexes rather than depth values for all pixels within a block on a reference depth map having the same position as the block blk.

Figure 4:
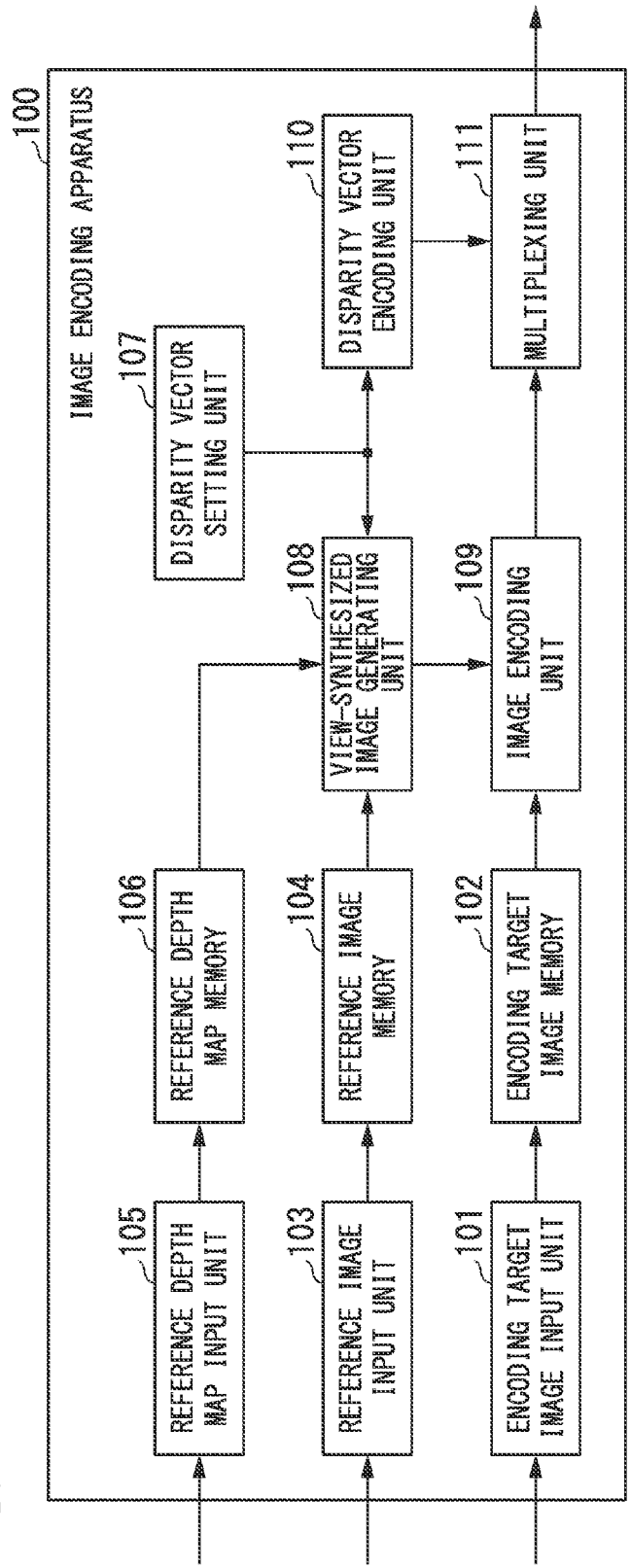
FIG. 4 is a block diagram illustrating a modified example of an image encoding apparatus illustrated in FIG. 1.

In addition, as another method, an arbitrary vector may be set as a disparity vector by performing a search on the reference depth map and the decoding side may be notified of the encoding of the set disparity vector. In this case, as illustrated in FIG. 4, it is only necessary for the image encoding apparatus 100 to further include a disparity vector encoding unit 110 and a multiplexing unit 111. FIG. 4 is a block diagram illustrating a modified example of the image encoding apparatus 100 illustrated in FIG. 1. The disparity vector encoding unit 110 encodes a disparity vector set by the disparity vector setting unit 107, and the multiplexing unit 111 multiplexes a bitstream of the disparity vector and a bitstream of an encoding target image and outputs a multiplexing result.

Figure 5:
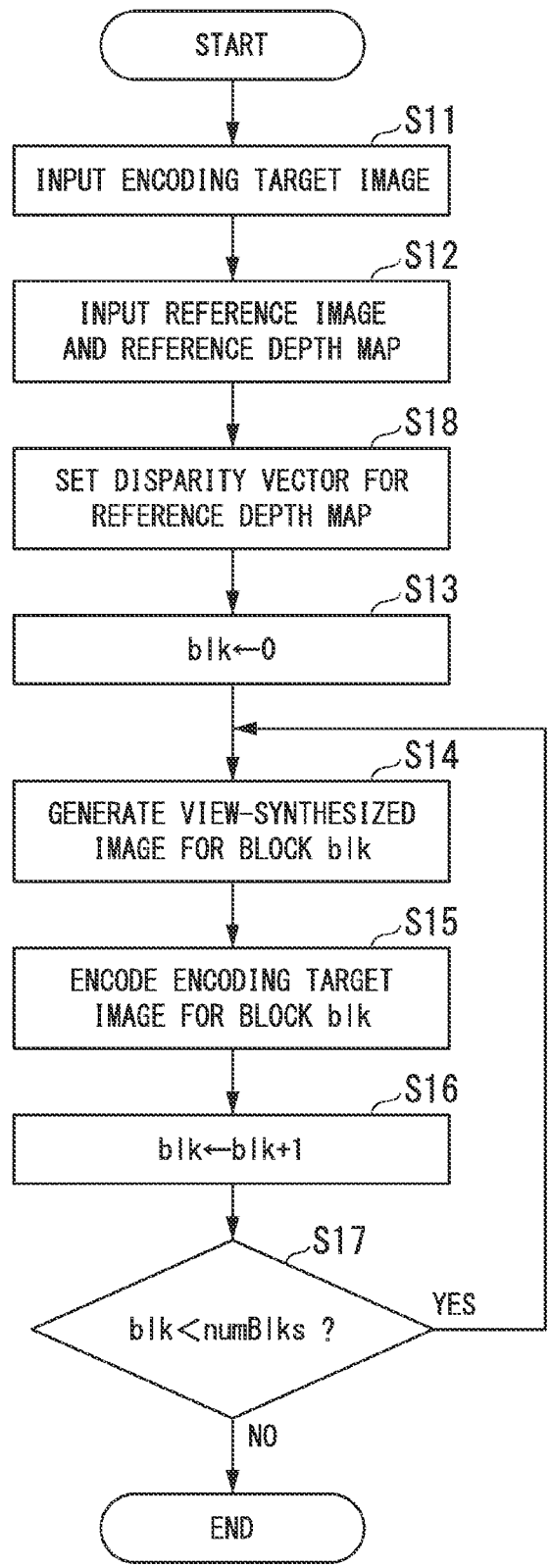
FIG. 5 is a flowchart illustrating a modified example of an operation of the image encoding apparatus illustrated in FIG. 1.

Also, a global disparity vector may be set for every large unit such as a frame or a slice without setting and encoding the disparity vector for every block and the set global disparity vector may be used as the same disparity vector in blocks within the frame or slice. In this case, as illustrated in FIG. 5, it is only necessary to set a disparity vector for a reference depth map (step S18) before a process to be performed for every block (before step S13) and skip step S1401 illustrated in FIG. 3. FIG. 5 is a flowchart illustrating a modified example of the operation illustrated in FIG. 2.

The global disparity vector may be set using various methods. For example, the vector may be obtained by regarding an overall region for setting a global disparity vector as one block and performing block matching. In addition, one global disparity vector may be obtained by dividing the overall region for setting the global disparity vector into a plurality of blocks and selecting a most likely vector from a plurality of vectors obtained by performing block matching for every block. In addition, one depth value may be obtained by analyzing a depth value for a region on a reference depth map having the same position as the set region and a disparity vector corresponding to the depth value may be specified as a global disparity vector.

As still another method, the disparity vector for the block blk may be set from vector information encoded in an encoded block before the block blk is encoded. Specifically, when disparity-compensated prediction is used when a block or a frame spatially or temporally adjacent to the block blk is encoded, some disparity vectors are encoded in the block. Accordingly, the disparity vector in the block blk may be obtained from the disparity vectors according to a predetermined method.

Figure 6:
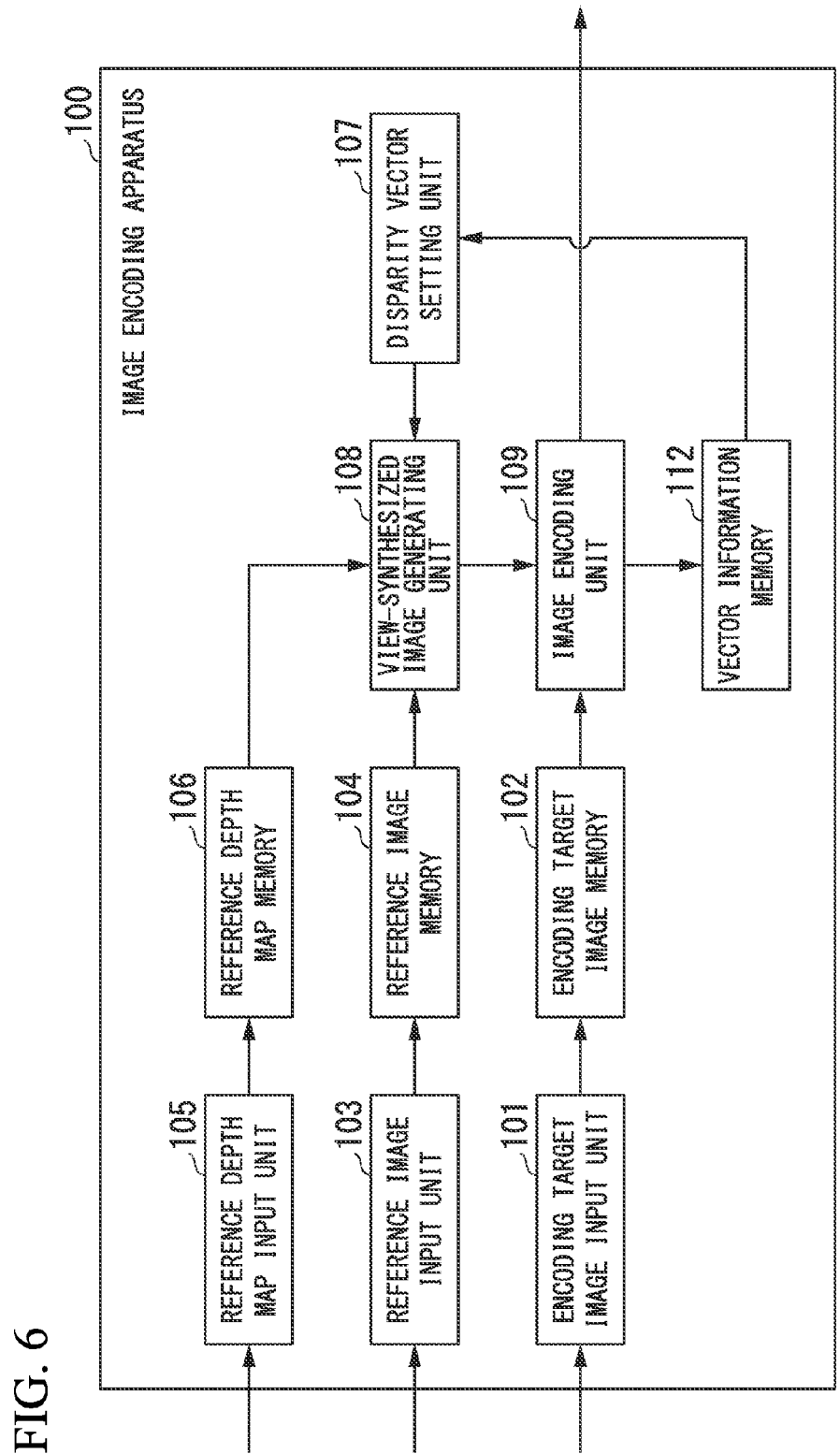
FIG. 6 is a block diagram illustrating another modified example of the image encoding apparatus illustrated in FIG. 1.

As the predetermined method, there is a method of performing median prediction from a disparity vector in an adjacent block or a method using a disparity vector in a specific block without change. In this case, as illustrated in FIG. 6, it is only necessary for the image encoding apparatus 100 to further include a vector information memory 112. FIG. 6 is a block diagram illustrating a modified example of the image encoding apparatus 100 illustrated in FIG. 1. The vector information memory 112 accumulates vector information used when the image encoding unit 109 generates a predicted image. The accumulated vector information is used when the disparity vector setting unit 107 sets a disparity vector for another block blk.

In addition, this method may be combined with a method of setting an arbitrary vector as a disparity vector by encoding the above-described disparity vector. For example, a difference vector between the set arbitrary vector and an estimated vector from vector information encoded in an encoded block before the block blk is encoded may be generated and the difference vector may be encoded.

Returning to FIG. 3, the view-synthesized image is generated for every sub-block obtained by dividing the block blk subsequently after the disparity vector for the block blk is set. That is, after a variable sblk indicating an index of the sub-block is initialized to 0 (step S1402), the following process (steps S1403 to S1405) is iterated until sblk reaches numSBlks (step S1407) while sblk is incremented by 1 (step S1406).

Here, numSBlks indicates the number of sub-blocks within the block blk.

Also, although it is possible to use various sizes or shapes of a sub-block, the same sub-block division is required to be obtained in the decoding side. For the size of the sub-block, for example, a predetermined division such as length×width, 2 pixels×2 pixels, 4 pixels×4 pixels, or 8 pixels×8 pixels may be used. Also, 1 pixel×1 pixel (that is, every pixel) or the same size (that is, there is no division) as that of the block blk may be used as the predetermined division.

As another method using the same sub-block division as that of the decoding side, a sub-block division method may be encoded and a notification of the method may be provided to the decoding side. In this case, the bitstream for the sub-block division method is multiplexed with a bitstream of an encoding target image and a multiplexed bitstream becomes part of a bitstream to be output by the image encoding apparatus 100. Also, when the sub-block division method is selected, it is possible to generate a high-quality predicted image in a small processing amount according to a process of generating a view-synthesized image to be described below by selecting a method in which pixels included in one sub-block have the same disparity as much as possible for the reference image and are divided into few sub-blocks as possible. Also, in this case, information indicating a sub-block division is decoded from the bitstream in the decoding side and the sub-block division is performed according to a method based on the decoded information.

As still another method, the sub-block division (a region division within an encoding target region) may be determined from a depth for a block blk+dv on the reference depth map indicated by the disparity vector dv set in step 1401 (predicted region division setting step). For example, it is possible to obtain the sub-block division by clustering a depth of a block blk+dv of a reference depth map. In addition, a configuration may be made to select a division in which a depth is most correctly classified from types of predetermined divisions without performing clustering.

In a process to be performed for every sub-block, first, one depth value is determined for the sub-block sblk using a reference depth map (step S1403). Specifically, one depth value is determined from a depth for a pixel within the block sblk+dv on the reference depth map indicated by the disparity vector dv set in step S1401.

Various methods may be used in a method of determining one depth from depths for pixels within a block. However, it is necessary to use the same method as that of the decoding side. For example, any one of an average value, a maximum value, a minimum value, and a median value among depth values for pixels within the block may be used. In addition, any one of an average value, a maximum value, a minimum value, and a median value among depth values for pixels of four apexes of the block may be used. Further, a depth value in a specific position (top left, center or the like) of the block may be used.

Also, when a depth value for a certain position within the block is used when the disparity vector dv is given in a fractional pixel, a depth value of the position is absent in a reference depth map. In this case, a depth value for a corresponding fractional pixel position may be obtained through interpolation and used and a depth value for the integer pixel position may be used by performing a rounding operation for an integer pixel position.

When the depth value is obtained for the sub-block sblk, then the disparity vector sdv (image reference disparity vector) for a reference image is obtained from the depth value (step S1404). The conversion from the depth value into the disparity vector is performed according to the definition of a camera parameter or the like. Also, when a coordinate value for a sub-block is necessary, a pixel position of a specific position such as the top left of the sub-block or a center position of the sub-block may be used. In addition, when the cameras are one-dimensionally disposed in parallel, it is possible to obtain a disparity vector from a depth value by referring to a lookup table created in advance because a disparity direction depends upon the camera layout and a disparity amount depends upon a depth value regardless of a sub-block position.

Next, a disparity-compensated image (inter-view predicted image) for a sub-block sblk is generated using an obtained disparity vector sdv and the reference image (step S1405, inter-view prediction step). Here, the process can use a method similar to conventional disparity-compensated prediction or motion-compensated prediction only using the given vector and the reference image.

Also, a process implemented by steps S1404 and S1405 is an example of a process of generating a view-synthesized image when one depth value is given for a sub-block blk. Here, any method may be used as long as a view-synthesized image can be generated from one depth value given for the sub-block. For example, a corresponding region (which is not required to have the same shape or size as the sub-block) on the reference image may be identified by assuming that the sub-block belongs to one depth plane and the view-synthesized image may be generated by warping the reference image for the corresponding region.

In addition, because there is an error in modeling of a projection model of a camera, parallelization (rectification) of a multi-view image, a depth, or the like, the error is included in a disparity vector obtained based on a camera parameter from the depth. In order to compensate for this error, a correction vector cmv may be used on a reference image for the disparity vector sdv. In this case, in step S1405, a disparity-compensated image is generated using the vector sdv+cmv as the disparity vector. Also, although any vector may be specified as the correction vector, it is possible to minimize an error of the disparity-compensated image and the encoding target image in the encoding target region or rate distortion cost in the encoding target region in setting of an efficient correction vector.

When the same correction vector as that of the decoding side is obtained, an arbitrary vector may be used.

For example, the arbitrary vector may be set and the decoding side may be notified of the encoded vector by encoding the vector. When the vector is encoded and transmitted, it is possible to suppress a bit amount necessary for the encoding by setting one correction vector for every block blk.

Also, when the correction vector is encoded, a vector is decoded at an appropriate timing (for every sub-block or every block) from the bitstream in the decoding side and the decoded vector is used as the correction vector.

When information related to a used inter-camera predicted image is accumulated for every block or sub-block, information indicating that a view-synthesized image using the depth has been referred to may be accumulated or information (image reference disparity vector) used when the inter-camera predicted image is actually generated may be accumulated (image reference disparity vector accumulation step). Also, the accumulated information is referred to when another block or another frame is encoded or decoded. For example, when vector information (a vector or the like to be used in disparity-compensated prediction) for a certain block is encoded or decoded, only a difference from the predicted vector information may be encoded or decoded by generating predicted vector information from vector information accumulated in an already encoded block around the block. As another example, a disparity vector dv for a certain block may be set using vector information accumulated in an already encoded or decoded block around the block.

As information indicating that a view-synthesized image using a depth has been referred to, corresponding prediction mode information may be accumulated. Information corresponding to an inter-frame prediction mode may be accumulated as a prediction mode. At this time, the reference frame information corresponding to the view-synthesized image may be accumulated as a reference frame. In addition, as vector information, the disparity vector dv may be accumulated or the disparity vector dv and the correction vector cmv may be accumulated.

As information used when an inter-camera predicted image is actually generated, the information corresponding to the inter-frame prediction mode may be accumulated as the prediction mode. At this time, the reference image may be accumulated as the reference frame. In addition, the disparity vector sdv for the reference image or the disparity vector sdv+cmv for the corrected reference image may be accumulated for every sub-block as the vector information. Also, there is a case in which two or more vectors are used within a sub-block such as a case in which warping or the like is used. In this case, all vectors may be accumulated or one vector may be selected and accumulated for every sub-block in a predetermined method. As a method of selecting one vector, for example, there is a method in which a disparity amount is specified as a maximum vector, a method of setting a vector in a specific position (upper left or the like) of the sub-block, or the like.

Figure 7:
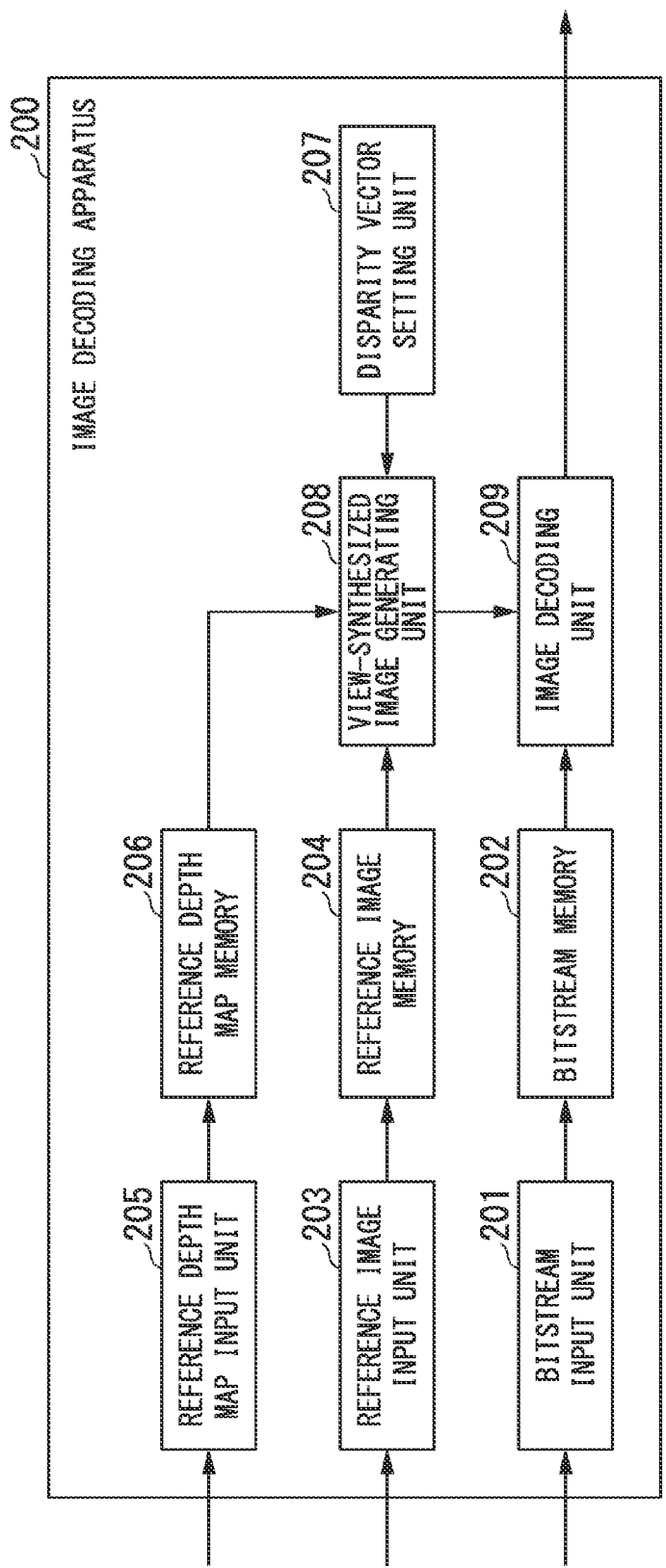
FIG. 7 is a block diagram illustrating a configuration of an image decoding apparatus in an embodiment of the present invention.

Next, an image decoding apparatus will be described. FIG. 7 is a block diagram illustrating a configuration of the image decoding apparatus in this embodiment. The image decoding apparatus 200 includes a bitstream input unit 201, a bitstream memory 202, a reference image input unit 203, a reference image memory 204, a reference depth map input unit 205, a reference depth map memory 206, a disparity vector setting unit 207, a view-synthesized image generating unit 208, and an image decoding unit 209.

The bitstream input unit 201 inputs a bitstream of encoded data obtained by encoding an image serving as a decoding target. Hereinafter, an image serving as the decoding target is referred to as a decoding target image. Here, an image of the camera B is indicated. In addition, hereinafter, a camera (here, the camera B) capturing the decoding target image is referred to as a decoding target camera.

The bitstream memory 202 stores a bitstream for an input decoding target image. The reference image input unit 203 inputs an image to be referred to when the view-synthesized image (disparity-compensated image) is generated. Hereinafter, the image input here is referred to as a reference image. Here, an image of the camera A is assumed to be input. The reference image memory 204 stores the input reference image. Hereinafter, the camera (here, the camera A) capturing the reference image is referred to as a reference camera.

The reference depth map input unit 205 inputs a depth map to be referred to when the view-synthesized image is generated. Here, although the depth map for the reference image is assumed to be input, the depth map may be a depth map for another camera. Hereinafter, the depth map is referred to as a reference depth map.

The depth map represents a three-dimensional position of the object shown in each pixel of the corresponding image. As long as the three-dimensional position is obtained through information such as a separately given camera parameter, any information may be used. For example, it is possible to use a distance from the camera to the object or a coordinate value for an axis which is not parallel to an image plane and a disparity amount for another camera (for example, the camera B). In addition, because it is only necessary to obtain the disparity amount here, the disparity map directly representing the disparity amount rather than the depth map may be used.

Also, although the depth map is given in the form of an image here, the depth map may not be configured in the form of an image as long as similar information is obtained. The reference depth map memory 206 stores the input reference depth map. Hereinafter, a camera (here, the camera A) corresponding to the reference depth map is referred to as a reference depth camera.

The disparity vector setting unit 207 sets the disparity vector for the reference depth map for every decoding target image or every block obtained by dividing the decoding target image. The view-synthesized image generating unit 208 (inter-view prediction unit) obtains a corresponding relationship of a pixel of the decoding target image and a pixel of the reference image using a reference depth map and generates a view-synthesized image for the decoding target image. The image decoding unit 209 outputs a decoded image by decoding the decoding target image from the bitstream using the view-synthesized image.

Figure 8:
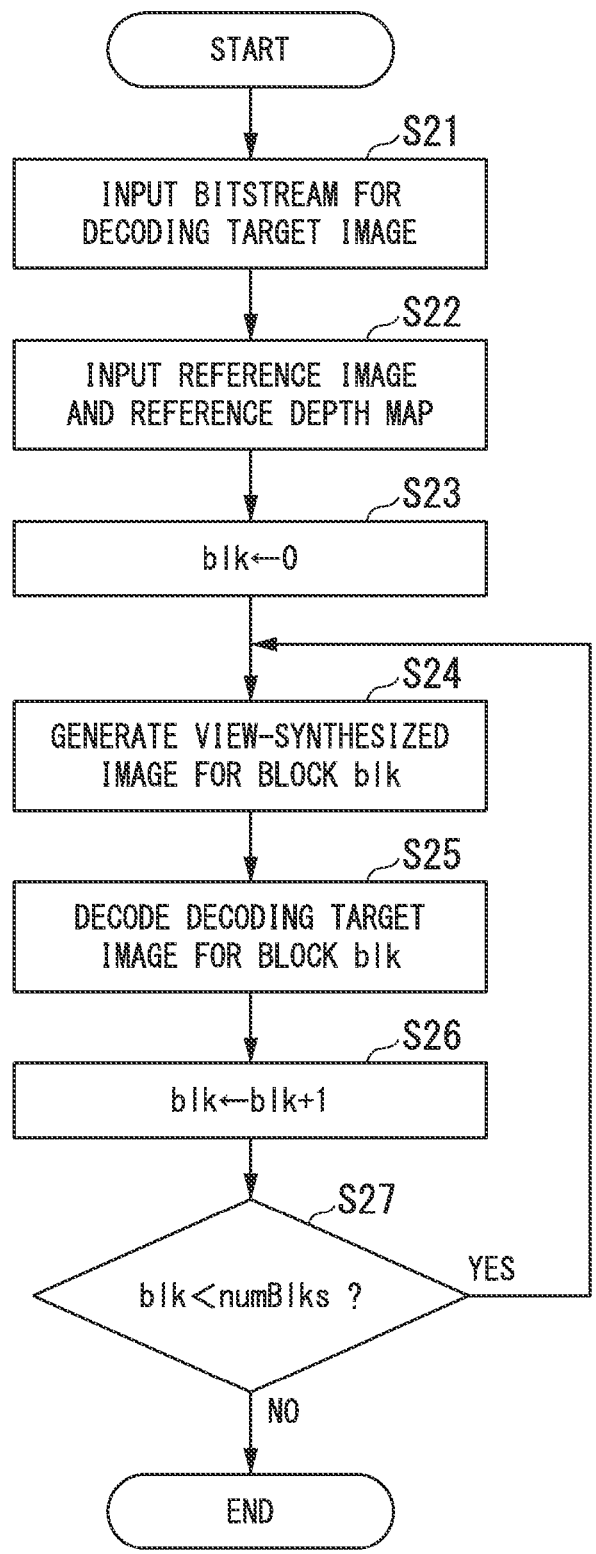
FIG. 8 is a flowchart illustrating an operation of an image decoding apparatus illustrated in FIG. 7.

Next, an operation of the image decoding apparatus 200 illustrated in FIG. 7 will be described with reference to FIG. 8. FIG. 8 is a flowchart illustrating an operation of the image decoding apparatus 200 illustrated in FIG. 7.

The bitstream input unit 201 inputs a bitstream obtained by encoding a decoding target image and stores the input bitstream in the bitstream memory 202 (step S21). In parallel with this, the reference image input unit 203 inputs a reference image and stores the input reference image in the reference image memory 204. In addition, the reference depth map input unit 205 inputs a reference depth map and stores the input reference depth map in the reference depth map memory 206 (step S22).

The reference image and the reference depth map input in step S22 are assumed to be the same as those used in the encoding side. This is because the occurrence of encoding noise such as a drift is suppressed by using exactly the same information as that used by the image encoding apparatus 100. However, when this occurrence of encoding noise is allowed, content different from content used at the time of encoding may be input. In relation to the reference depth map, a depth map estimated by applying stereo matching or the like to a multi-view image decoded for a plurality of cameras, a depth map estimated using a decoded disparity vector or motion vector or the like, or the like may be used in addition to separately decoded content.

Next, the image decoding apparatus 200 decodes a decoding target image from a bitstream while creating a view-synthesized image for every block obtained by dividing the decoding target image. That is, after a variable blk indicating an index of a block of a decoding target image is initialized to 0 (step S23), the following process (steps S24 and S25) is iterated until blk reaches numBlks (step S27) while blk is incremented by 1 (step S26). Also, numBlks indicates the number of unit blocks on which a decoding process is performed in the decoding target image.

In the process to be performed for every block of the decoding target image, first, a view-synthesized image for the block blk is generated in the disparity vector setting unit 207 (reference depth region setting unit) and the view-synthesized image generating unit 208 (inter-view prediction unit) (step S24). Because the process here is the same as step S14 illustrated in FIG. 2 described above (steps S1401 to 1407 illustrated in FIG. 3), detailed description thereof is omitted. A sub-block division (a region division within the encoding target region) by the view-synthesized image generating unit 208 serving as a predicted region division setting unit and a process to be performed for every sub-block are also similar.

Next, when the disparity-compensated image has been obtained, the image decoding unit 209 decodes the decoding target image from the bitstream and outputs the decoded image while using the view-synthesized image as a predicted image (step S25). The decoded image obtained as a result of decoding becomes an output of the image decoding apparatus 200. Also, as long as the bitstream can be correctly decoded, any method may be used in decoding. In general, a method corresponding to that used at the time of encoding is used.

When encoding is performed by general moving-image encoding or image encoding such as MPEG-2, H.264, or JPEG, decoding is performed by performing entropy decoding, inverse binarization, inverse quantization, and the like for every block, obtaining a predictive residual signal by performing inverse frequency conversion such as an inverse discrete cosine transform (IDCT), adding a predicted image to the predictive residual signal, and clipping the image in a pixel value range.

Although a view-synthesized image is used as a predicted image in all blocks in this embodiment, an image generated by a different method for every block may be used as a predicted image. In this case, it is necessary to discriminate a method in which a generated image is used as a predicted image and use an appropriate predicted image. For example, when information indicating a method (mode or vector information or the like) of generating the predicted image is encoded and the encoded information is included in a bitstream as in H.264, an appropriate predicted image may be selected and decoded by decoding the information.

Figure 9:
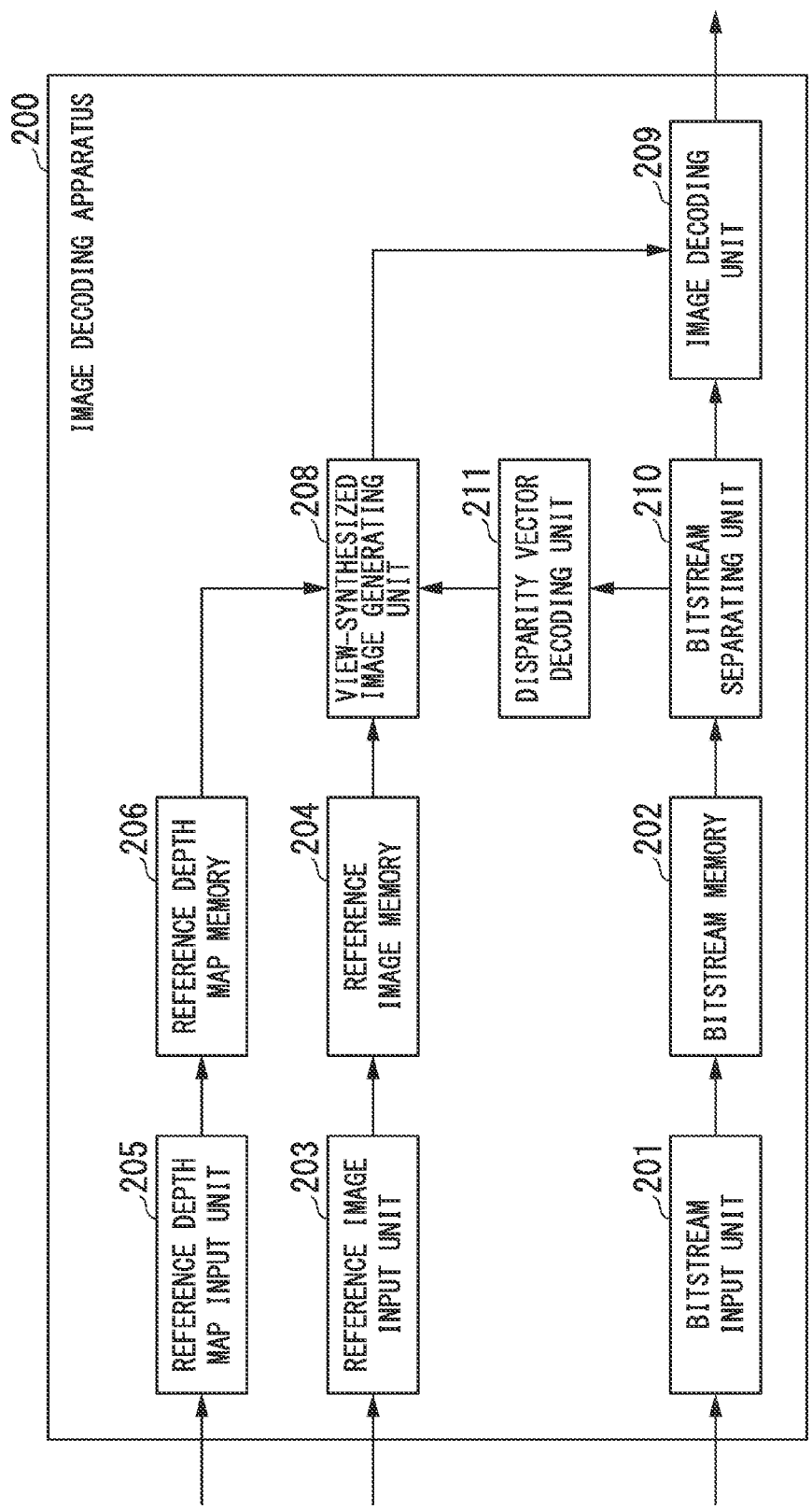
FIG. 9 is a block diagram illustrating a modified example of the image decoding apparatus illustrated in FIG. 7.

Also, although a detailed process of step S24 illustrated in FIG. 8 is equivalent to a processing operation illustrated in FIG. 3, it is necessary to perform the same process as that of the encoding side in step S1401 in which the disparity vector dv is set. As one method, there is a case in which the disparity vector dv is multiplexed into a bitstream. In this case, as illustrated in FIG. 9, it is only necessary for the image decoding apparatus 200 to further include a bitstream separating unit 210 and a disparity vector decoding unit 211 (depth reference disparity vector setting unit). FIG. 9 is a block diagram illustrating a modified example of the image decoding apparatus 200 illustrated in FIG. 7.

Figure 10:
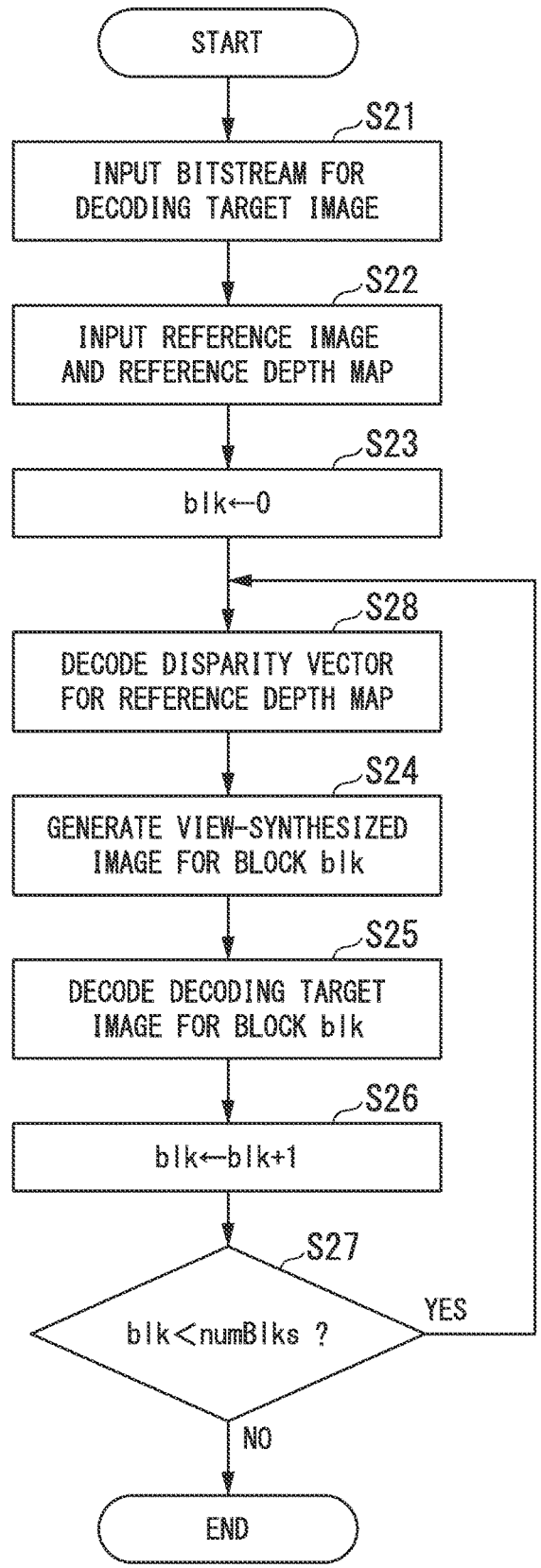
FIG. 10 is a flowchart illustrating a modified example of an operation of the image decoding apparatus illustrated in FIG. 7.

The bitstream separating unit 210 separates the input bitstream into a bitstream for the disparity vector dv and a bitstream for a decoding target image. In addition, the disparity vector decoding unit 211 decodes the disparity vector dv from the separated bitstream. The decoded disparity vector is used in the view-synthesized image generating unit 208. That is, after the disparity vector is decoded for every block blk as illustrated in FIG. 10 (step S28), the generation of the view-synthesized image (step S24) and the decoding of the decoding target image (step S25) are performed. FIG. 10 is a flowchart illustrating a modified example of the operation illustrated in FIG. 8.

Figure 11:
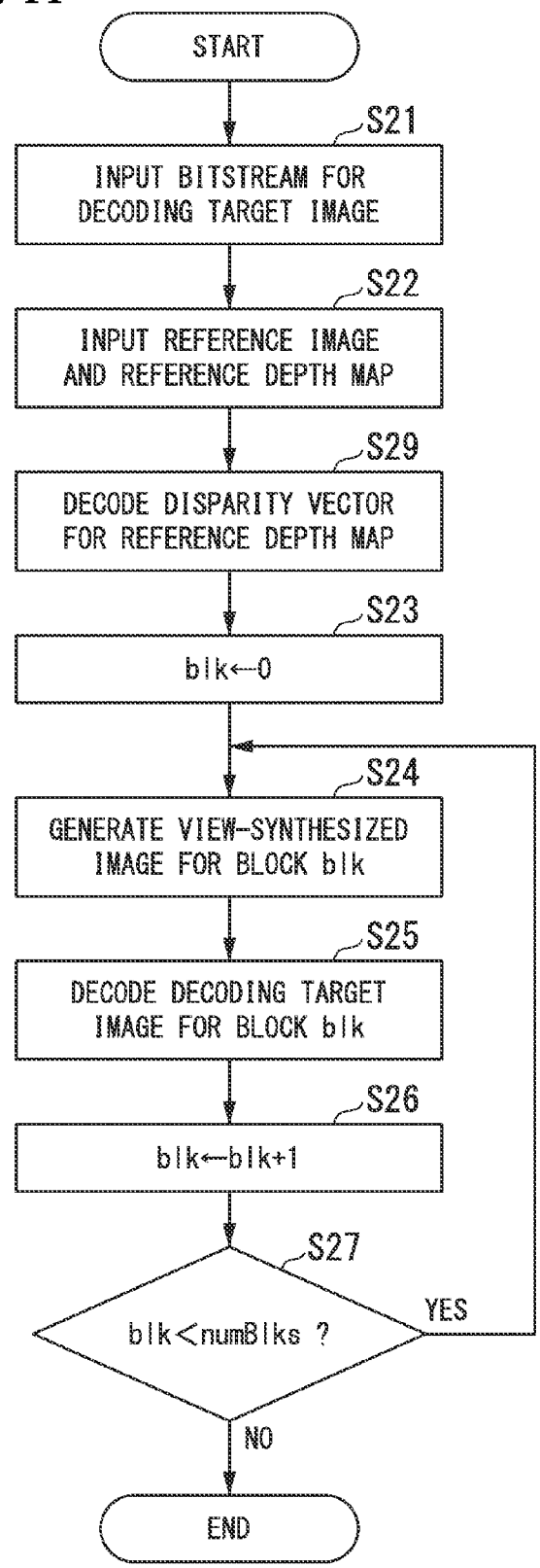
FIG. 11 is a flowchart illustrating another modified example of the operation of the image decoding apparatus illustrated in FIG. 7.

Also, a decoded global disparity vector may be used as the same disparity vector in the block within the frame or the slice by decoding the global disparity vector for every large unit such as a frame or slice without decoding a disparity vector for every block. In this case, as illustrated in FIG. 11, before a process to be performed for every block, a disparity vector for the reference depth map is decoded (step S29). FIG. 11 is a flowchart illustrating the modified example of the operation illustrated in FIG. 8.

As still another method, the disparity vector for the block blk may be set from vector information decoded in a decoded block before the block blk is decoded.

Specifically, when disparity-compensated prediction is used when a block, a frame, or the like spatially or temporally adjacent to the block blk has been decoded, some disparity vectors are decoded in the block. Accordingly, from these disparity vectors, the disparity vector in the block blk may be obtained according to a predetermined method.

Figure 12:
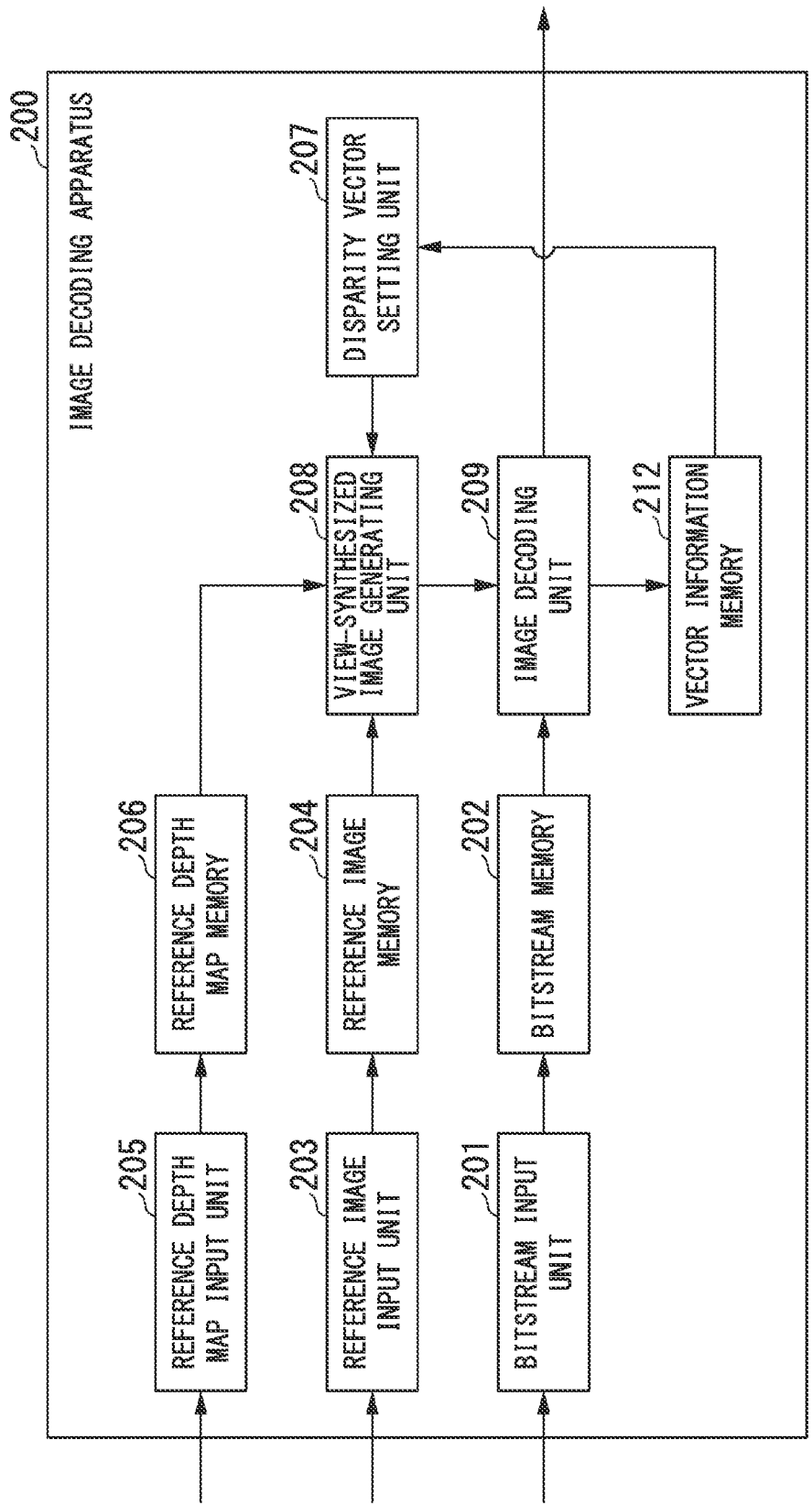
FIG. 12 is a block diagram illustrating another modified example of the image decoding apparatus illustrated in FIG. 7.

As the predetermined method, there is a method of performing median prediction from a disparity vector in an adjacent block or a method using a disparity vector in a specific block without change. In this case, as illustrated in FIG. 12, it is only necessary for the image decoding apparatus 200 to further include a vector information memory 212 (image reference disparity vector accumulation unit). FIG. 12 is a block diagram illustrating a modified example of the image decoding apparatus 200 illustrated in FIG. 7. The vector information memory 212 accumulates vector information used when the image decoding unit 209 generates a predicted image. The accumulated vector information is used when the disparity vector setting unit 207 sets a disparity vector for another block blk.

In addition, this method may be combined with a method of setting an arbitrary vector as a disparity vector by decoding the above-described disparity vector. For example, a vector decoded from the bitstream may be added to a vector estimated from the vector information decoded in the block decoded before the block blk is decoded and the added vector may be set as the disparity vector dv. Also, as described above, the disparity vector dv may be obtained from the depth value of the reference depth map having the same position as the block blk.

Although a process of encoding and decoding all pixels of one frame has been described in the above description, encoding or decoding may be performed by applying a process of the embodiment of the present invention for only some pixels and employing intra-screen predictive encoding, motion-compensated predictive encoding, or the like to be used in H.264/AVC or the like for the other pixels. In this case, it is necessary to encode and decode information representing a method used for prediction for every pixel. In addition, encoding or decoding may be performed using a separate prediction scheme for every block rather than every pixel. Also, when prediction is performed using a view-synthesized image only for some pixels or blocks, it is possible to reduce a calculation amount in a view synthesizing process by performing a process (step S14 illustrated in FIG. 2 and step S24 and S28 illustrated in FIG. 8) of generating the view-synthesized image only for the pixels.

In addition, although a process of encoding and decoding one frame has been described above, the present invention may also be applied to moving-image encoding by iterating a plurality of frames. In addition, the present invention is applicable to some frames or some blocks of moving images. Further, although configurations and processing operations of the image encoding apparatus and the image decoding apparatus have been described above, it is possible to implement the image encoding method and the image decoding method of the present invention according to a processing operation corresponding to an operation of each unit of the image encoding apparatus and the image decoding apparatus.

Further, although a reference depth map has been described as a depth map for an image captured by a camera different from an encoding target camera or a decoding target camera above, it is possible to use a depth map for an image captured by an encoding target camera or a decoding target camera at a different time from the encoding target image or the decoding target image as a reference depth map. In this case, a motion vector rather than a disparity vector is set or decoded in steps S1401, S18, S28, and S29.

Figure 13:
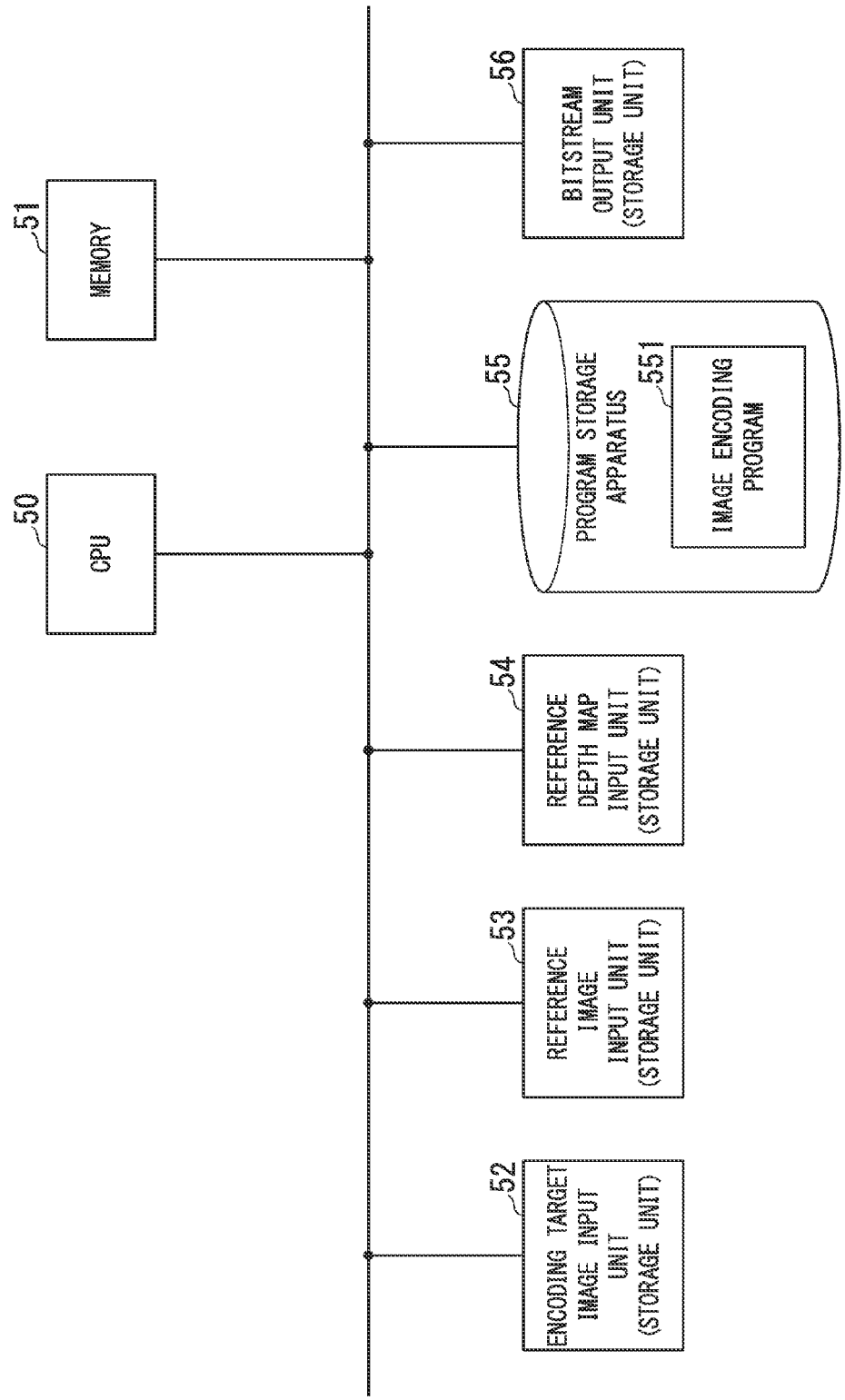
FIG. 13 is a block diagram illustrating a hardware configuration when the image encoding apparatus is constituted of a computer and a software program.

FIG. 13 is block diagram illustrating a hardware configuration when the above-described image encoding apparatus 100 is constituted of a computer and a software program.

The system illustrated in FIG. 13 has a configuration in which a central processing unit (CPU) 50 configured to execute the program, a memory 51, an encoding target image input unit 52, a reference image input unit 53, a reference depth map input unit 54, a program storage apparatus 55, and a bitstream output unit 56 are connected through a bus.

The memory 51 such as a random access memory (RAM) stores the program and data to be accessed by the CPU 50. The encoding target image input unit 52 inputs an image signal of an encoding target from a camera or the like. The encoding target image input unit 52 may be a storage unit such as a disc apparatus configured to store an image signal. The reference image input unit 53 inputs an image signal of a reference target from a camera or the like. This reference image input unit 53 may be a storage unit such as a disc apparatus configured to store an image signal. The reference depth map input unit 54 inputs a depth map for a camera of a different position or direction from the camera capturing the encoding target image from a depth camera or the like. The reference depth map input unit 54 may be a storage unit such as a disc apparatus configured to store the depth map. The program storage apparatus 55 stores an image encoding program 551 which is a software program for causing the CPU 50 to execute the above-described image encoding process. The bitstream output unit 56 outputs a bitstream generated by executing the image encoding program 551 loaded by the CPU 50 to the memory 51, for example, via a network. The bitstream output unit 56 may be a storage unit such as a disc apparatus configured to store the bitstream.

Figure 14:
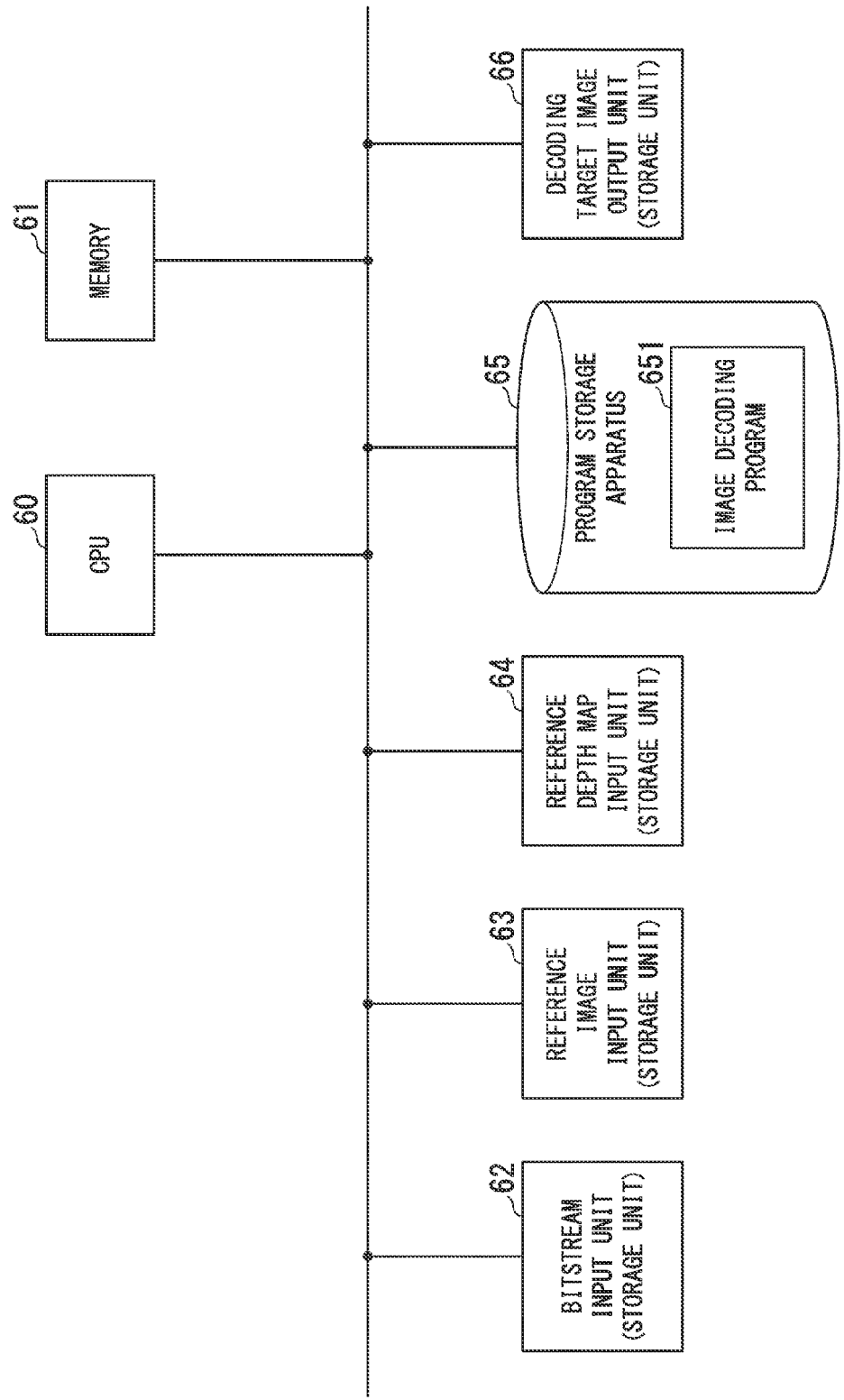
FIG. 14 is a block diagram illustrating a hardware configuration example when the image decoding apparatus is constituted of a computer and a software program.
Figure 15:
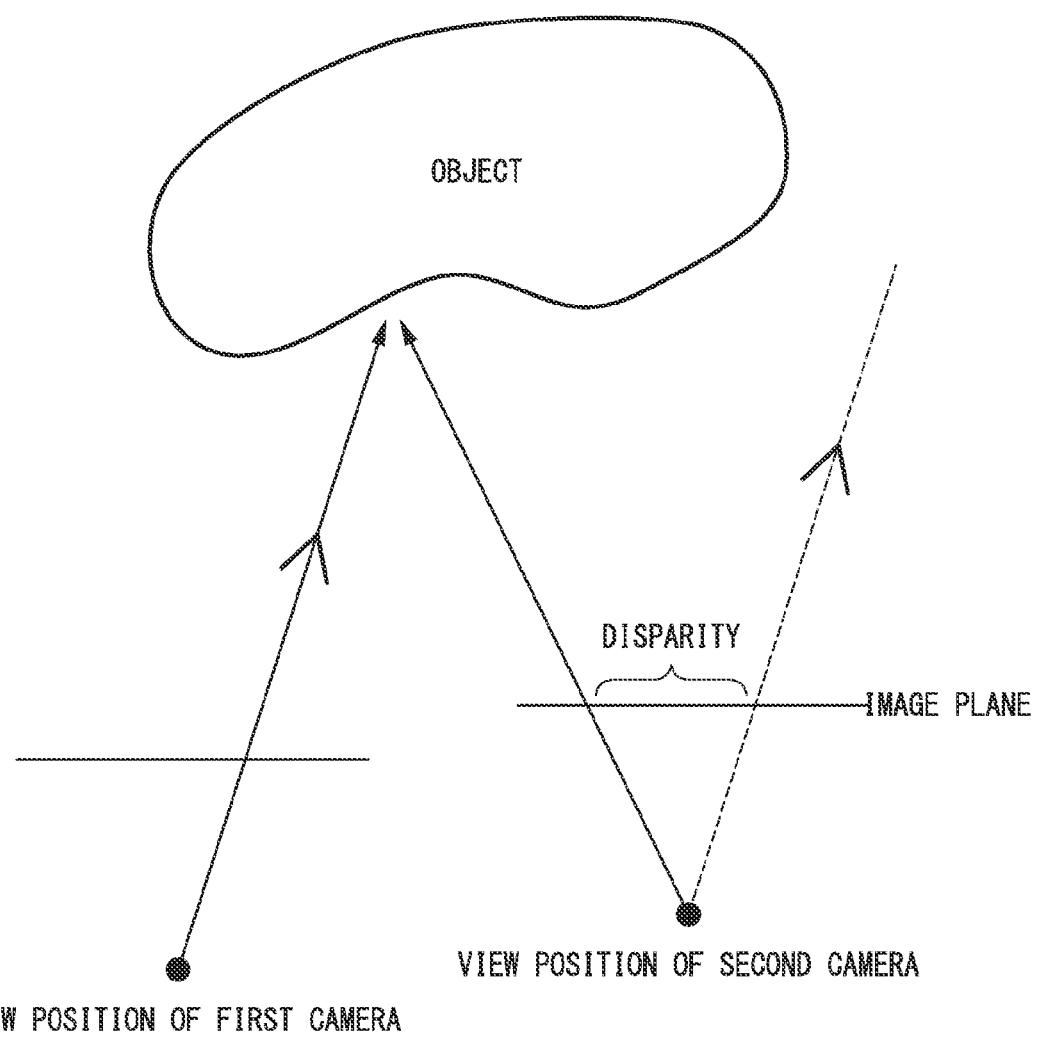
FIG. 15 is a conceptual diagram of disparity which occurs between cameras.
Figure 16:
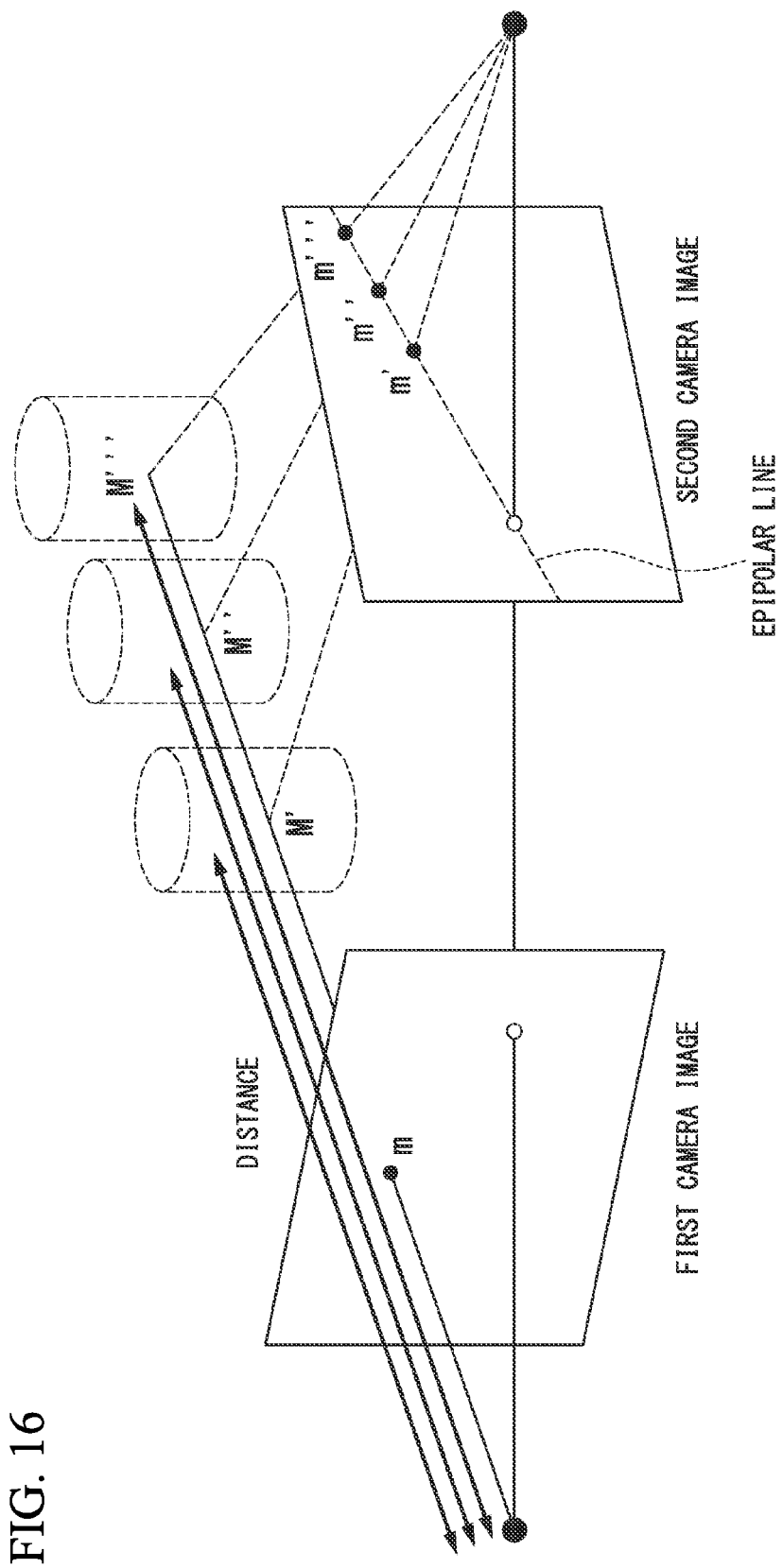
FIG. 16 is a conceptual diagram of epipolar geometric constraints.

FIG. 14 is a block diagram illustrating a hardware configuration when the above-described image decoding apparatus 200 is constituted of a computer and a software program.

The system illustrated in FIG. 14 has a configuration in which a CPU 60 configured to execute the program, a memory 61, a bitstream input unit 62, a reference image input unit 63, a reference depth map input unit 64, a program storage apparatus 65, and a decoding target image output unit 66 are connected through a bus.

The memory 61 such as a RAM stores the program and data to be accessed by the CPU 60. The bitstream input unit 62 inputs a bitstream encoded by the image encoding apparatus according to this technique. This bitstream input unit 62 may be a storage unit such as a disc apparatus configured to store an image signal. The reference image input unit 63 inputs an image signal of a reference target from a camera or the like. The reference image input unit 63 may be a storage unit such as a disc apparatus configured to store an image signal. The reference depth map input unit 64 inputs a depth map for a camera of a different position or direction from the camera capturing the decoding target from a depth camera or the like. The reference depth map input unit 64 may be a storage unit such as a disc apparatus configured to store the depth information. The program storage apparatus 65 stores an image decoding program 651 which is a software program for causing the CPU 60 to execute the above-described image decoding process. The decoding target image output unit 66 outputs a decoding target image obtained by decoding the bitstream to a reproduction apparatus or the like by executing the image decoding program 651 loaded to the memory 61 by the CPU 60. The decoding target image output unit 66 may be a storage unit such as a disc apparatus configured to store the image signal.

In addition, the image encoding process and the image decoding process may be executed by recording a program for implementing functions of the processing units in the image encoding apparatus 100 illustrated in FIG. 1 and the image decoding apparatus 200 illustrated in FIG. 7 on a computer-readable recording medium and causing a computer system to read and execute the program recorded on the recording medium. Also, the "computer system" used here is assumed to include an operating system (OS) and hardware such as peripheral devices. In addition, the computer system is assumed to include a homepage providing environment (or displaying environment) when a World Wide Web (WWW) system is used. In addition, the computer-readable recording medium refers to a storage apparatus including a flexible disk, a magneto-optical disc, a read only memory (ROM), or a portable medium such as a compact disc (CD)-ROM, and a hard disk embedded in the computer system. Furthermore, the "computer-readable recording medium" is assumed to be a medium that holds a program for a constant period of time, such as a volatile memory (RAM) inside a computer system serving as a server or a client when the program is transmitted via a network such as the Internet or a communication circuit such as a telephone circuit.

In addition, the above-described program may be transmitted from a computer system storing the program in a storage apparatus or the like via a transmission medium or transmitted to another computer system by transmission waves in a transmission medium. Here, the "transmission medium" for transmitting the program refers to a medium having a function of transmitting information, such as a network (communication network) like the Internet or a communication circuit (communication line) like a telephone circuit. In addition, the above-described program may be a program for implementing some of the above-described functions. Further, the above-described program may be a program, i.e., a so-called differential file (differential program), capable of implementing the above-described function in combination with a program already recorded on the computer system.

While the embodiments of the invention have been described above with reference to the drawings, it should be understood that these are exemplary of the invention and are not to be considered as limiting. Accordingly, additions, omissions, substitutions, and other modifications of constituent elements may be made without departing from the spirit or scope of the present invention.

INDUSTRIAL APPLICABILITY

The present invention is applicable for essential use in achieving high encoding efficiency with a small calculation amount when disparity-compensated prediction is performed on an encoding (decoding) target image using a depth map for an image captured from a position different from a camera capturing the encoding (decoding) target image.

DESCRIPTION OF REFERENCE SYMBOLS

101 Encoding target image input unit
102 Encoding target image memory
103 Reference image input unit
104 Reference image memory
105 Reference depth map input unit
106 Reference depth map memory
107 Disparity vector setting unit
108 View-synthesized image generating unit
109 Image encoding unit
110 Disparity vector encoding unit
111 Multiplexing unit
112 Vector information memory
201 Bitstream input unit
202 Bitstream memory
203 Reference image input unit
204 Reference image memory
205 Reference depth map input unit
206 Reference depth map memory
207 Disparity vector setting unit
208 View-synthesized image generating unit
209 Image decoding unit
210 Bitstream separating unit
211 Disparity vector decoding unit
212 Vector information memory

The invention claimed is:

1. An image decoding apparatus which performs decoding while predicting an image between different views using a reference image decoded for a view different from a decoding target image and a reference depth map which is a depth map for an object of the reference image when the decoding target image is decoded from encoded data of a multi-view image including images of a plurality of different views, the image decoding apparatus comprising:

a reference depth region setting unit configured to set a reference depth region which is a corresponding region on the reference depth map for decoding target regions into which the decoding target image is divided;

an inter-view prediction unit configured to generate an inter-view predicted image for the decoding target region from the reference image using depth information in the reference depth region as depth information for the decoding target region, the inter-view predicted image having the same size as the decoding target region; and an image decoding unit configured to decode the decoding target image from the encoded data using the inter-view predicted image and output a decoded image.

2. The image decoding apparatus according to claim 1, further comprising:

a depth reference disparity vector setting unit configured to set a depth reference disparity vector which is a disparity vector for a reference depth map with respect to the decoding target region, wherein the reference depth region setting unit sets a region indicated by the depth reference disparity vector as the reference depth region.

3. The image decoding apparatus according to claim 2, wherein the depth reference disparity vector setting unit sets the depth reference disparity vector using a disparity vector used when a region adjacent to the decoding target region is decoded.

4. The image decoding apparatus according to claim 2, wherein the depth reference disparity vector setting unit sets the depth reference disparity vector using depth information for a region on the reference depth map having the same position as the decoding target region.

5. The image decoding apparatus according to claim 1, wherein the inter-view prediction unit sets a representative depth using depth information within the corresponding reference depth region for every predicted region obtained by dividing the decoding target region and generates an inter-view predicted image for the decoding target region by generating a view-synthesized image from the representative depth and the reference image.

6. The image decoding apparatus according to claim 5, further comprising:

a predicted region division setting unit configured to set region divisions within the decoding target region based on depth information within the reference depth region, wherein the inter-view prediction unit designates a region obtained according to the region division as the predicted region.

7. The image decoding apparatus according to claim 1, wherein the inter-view prediction unit sets an image reference disparity vector which is a disparity vector for the reference image using depth information within the corresponding reference depth region for every predicted region obtained by dividing the decoding target region and generates an inter-view predicted image for the decoding target region by generating a disparity-compensated image using the image reference disparity vector and the reference image.

8. The image decoding apparatus according to claim 7, further comprising:

an image reference disparity vector accumulation unit configured to accumulate the image reference disparity vector; and a disparity prediction unit configured to generate predicted disparity information for a region adjacent to the decoding target region using the accumulated image reference disparity vector.

9. The image decoding apparatus according to claim 8, wherein the disparity prediction unit generates a depth reference disparity vector for a region adjacent to the decoding target region.

10. The image decoding apparatus according to claim 7, further comprising:
   a correction disparity vector setting unit configured to set a correction disparity vector which is a vector for correcting the image reference disparity vector,
   wherein the inter-view prediction unit generates the inter-view predicted image by generating a disparity-compensated image using a vector obtained by correcting the image reference disparity vector through the correction disparity vector and the reference image.

11. The image decoding apparatus according to claim 10, wherein the correction disparity vector setting unit sets one vector as the correction disparity vector for the decoding target region.

12. The image decoding apparatus according to claim 7, further comprising:
   a predicted region division setting unit configured to set region divisions within the decoding target region based on depth information within the reference depth region,
   wherein the inter-view prediction unit designates a region obtained according to the region division as the predicted region.

13. An image decoding method which performs decoding while predicting an image between different views using a reference image decoded for a view different from a decoding target image and a reference depth map which is a depth map for an object of the reference image when the decoding target image is decoded from encoded data of a multi-view image including images of a plurality of different views, the image decoding method comprising:
   a reference depth region setting step of setting a reference depth region which is a corresponding region on the reference depth map for decoding target regions into which the decoding target image is divided;
   an inter-view prediction step of generating an inter-view predicted image for the decoding target region from the reference image using depth information in the reference depth region as depth information for the decoding target region, the inter-view predicted image having the same size as the decoding target region; and
   an image decoding step of decoding the decoding target image from the encoded data using the inter-view predicted image and output a decoded image.

14. A non-transitory computer-readable recoding medium having an image decoding program for causing a computer to execute the image decoding method according to claim 13.

15. An image encoding apparatus which performs encoding while predicting an image between different views using a reference image encoded for a different view from an encoding target image and a reference depth map which is a depth map for an object of the reference image when a multi-view image including images of a plurality of different views is encoded, the image encoding apparatus comprising:
   a reference depth region setting unit configured to set a reference depth region which is a corresponding region on the reference depth map for encoding target regions into which the encoding target image is divided;
   an inter-view prediction unit configured to generate an inter-view predicted image for the encoding target region from the reference image using depth information in the reference depth region as depth information for the encoding target region, the inter-view predicted image having the same size as the encoding target region; and
   an image encoding unit configured to perform predictive encoding on the encoding target image using the inter-view predicted image and output a predictive encoding result.

16. An image encoding method which performs encoding while predicting an image between different views using a reference image encoded for a different view from an encoding target image and a reference depth map which is a depth map for an object of the reference image when a multi-view image including images of a plurality of different views is encoded, the image encoding method comprising:
   a reference depth region setting step of setting a reference depth region which is a corresponding region on the reference depth map for encoding target regions into which the encoding target image is divided;
   an inter-view prediction step of generating an inter-view predicted image for the encoding target region from the reference image using depth information in the reference depth region as depth information for the encoding target region, the inter-view predicted image having the same size as the encoding target region; and
   an image encoding step of performing predictive encoding on the encoding target image using the inter-view predicted image and outputting a predictive encoding result.

17. A non-transitory computer-readable recoding medium having an image encoding program for causing a computer to execute the image encoding method according to claim 16.

* * * * *